United States Patent
Sharaff et al.

(10) Patent No.: US 12,293,233 B2
(45) Date of Patent: May 6, 2025

(54) AUTOMATED METHODS AND SYSTEMS THAT PROVIDE RESOURCE RECOMMENDATIONS FOR VIRTUAL MACHINES

(71) Applicant: VMware LLC, Palo Alto, CA (US)

(72) Inventors: Nitu Sharaff, Palo Alto, CA (US); Yanislav Yankov, Palo Alto, CA (US)

(73) Assignee: VMWare LLC, Palo Alto, CA (US)

( * ) Notice: Subject to any disclaimer, the term of this patent is extended or adjusted under 35 U.S.C. 154(b) by 517 days.

(21) Appl. No.: 17/494,699

(22) Filed: Oct. 5, 2021

(65) Prior Publication Data
US 2023/0106318 A1    Apr. 6, 2023

(51) Int. Cl.
*G06F 9/50* (2006.01)
*G06N 20/00* (2019.01)

(52) U.S. Cl.
CPC .......... *G06F 9/5077* (2013.01); *G06F 9/5016* (2013.01); *G06F 9/5027* (2013.01); *G06N 20/00* (2019.01); *G06F 2209/503* (2013.01)

(58) Field of Classification Search
None
See application file for complete search history.

(56) References Cited

U.S. PATENT DOCUMENTS

| | | | | |
|---|---|---|---|---|
| 6,651,048 B1 * | 11/2003 | Agrawal | ............. | G06F 16/2465 707/999.102 |
| 9,760,398 B1 * | 9/2017 | Pai | ........................ | G06F 9/5027 |
| 2002/0152246 A1 * | 10/2002 | Critchlow | ............... | G06F 40/53 715/265 |
| 2008/0082013 A1 * | 4/2008 | Xue | ........................ | A61B 5/349 600/509 |
| 2012/0266164 A1 * | 10/2012 | Anderson, III | ....... | G06F 9/5077 718/1 |
| 2014/0123136 A1 * | 5/2014 | Beda, III | .............. | G06F 16/144 718/1 |
| 2018/0121237 A1 * | 5/2018 | Crowe | .................. | G06F 3/0635 |
| 2019/0310935 A1 * | 10/2019 | Shuster | ................. | G06F 21/566 |
| 2020/0074306 A1 * | 3/2020 | Giral | ..................... | G06N 20/20 |
| 2020/0183769 A1 * | 6/2020 | Poghosyan | ......... | G06F 11/0751 |

(Continued)

*Primary Examiner* — Adam Lee
(74) *Attorney, Agent, or Firm* — Quarles & Brady LLP

(57) ABSTRACT

The current document is directed to methods and systems that generate recommendations for resource specifications used in virtual-machine-hosting requests. When distributed applications are submitted to distributed-computer-system-based hosting platforms for hosting, the hosting requester generally specifies the computational resources that will need to be provisioned for each virtual machine included in a set of virtual machines that correspond to the distributed application, such as the processor bandwidth, memory size, local and remote networking bandwidths, and data-storage capacity needed for supporting execution of each virtual machine. In many cases, the hosting platform reserves the specified computational resources and accordingly charges for them. However, in many cases, the specified computational resources significantly exceed the computational resources actually needed for hosting the distributed application. The currently disclosed methods and systems employ machine learning to provide accurate estimates of the computational resources for the VMs of a distributed application.

20 Claims, 32 Drawing Sheets

(56) References Cited

U.S. PATENT DOCUMENTS

| | | | |
|---|---|---|---|
| 2020/0225970 A1* | 7/2020 | Mohanta | G06F 9/45558 |
| 2021/0250639 A1* | 8/2021 | Gupta | H04N 21/43615 |
| 2021/0263804 A1* | 8/2021 | Zhang | G06F 16/2246 |
| 2022/0092437 A1* | 3/2022 | Xu | G06F 18/22 |
| 2022/0107847 A1* | 4/2022 | Shaffer | G06N 3/04 |
| 2022/0189638 A1* | 6/2022 | Campbell | G16H 50/20 |
| 2022/0335302 A1* | 10/2022 | Banipal | G06N 3/088 |
| 2023/0005603 A1* | 1/2023 | Rahman | A61B 5/14542 |
| 2023/0013340 A1* | 1/2023 | Wu | G06N 3/04 |

\* cited by examiner

FIG. 14B $$\text{Entropy} = -\sum_{i=f_0}^{f_n} P(i)\log_2 P(i)$$

1431, 1432

$$w = \frac{\text{numChild}}{\text{numParent}}$$

1439

$$\text{Entropy Gain} = E_p - (W_{C1}E_{C1} + W_{C2}E_{C2})$$

1434, 1436, 1437, 1438

1430:

| | | |
|---|---|---|
| A | a | -0.54 |
| A | b | -0.22 |
| A | f | -0.12 |
| B | p | -0.09 |
| B | s | -0.02 |
| B | t | -0.11 |
| B | g | -0.21 |
| C | k | -0.08 |
| C | m | -0.28 |
| C | n | -0.16 |

*  ← 1431

1440 (2) — 1442:

| num | A | B | C | flavor |
|---|---|---|---|---|
| 1 | a | p | m | 2 |
| 2 | a | p | k | 11 |
| 3 | a | g | k | 4 |
| 4 | a | g | m | 10 |
| 5 | a | s | n | 11 |
| 6 | a | p | m | 11 |
| 7 | a | t | n | 11 |
| 8 | a | s | m | 2 |
| 9 | a | g | k | 11 |
| 10 | a | s | m | 10 |
| 11 | a | g | k | 11 |
| 12 | a | p | n | 11 |
| 13 | a | s | m | 4 |
| 14 | a | g | k | 11 |
| 15 | a | t | m | 11 |
| 16 | a | t | m | 2 |
| 17 | a | s | n | 11 |

1441 (3) — 1442:

| num | A | B | C | flavor |
|---|---|---|---|---|
| 1 | b | p | k | 1 |
| 2 | f | s | n | 1 |
| 3 | b | p | m | 1 |
| 4 | b | s | m | 2 |
| 5 | b | p | n | 10 |
| 6 | b | t | k | 4 |
| 7 | f | s | k | 1 |
| 8 | b | g | k | 10 |
| 9 | f | g | m | 2 |
| 10 | f | g | n | 10 |
| 11 | b | t | m | 2 |
| 12 | f | p | k | 4 |
| 13 | b | p | k | 1 |
| 14 | f | s | m | 4 |
| 15 | b | p | k | 4 |
| 16 | f | s | n | 1 |
| 17 | b | p | m | 1 |
| 18 | f | g | k | 10 |
| 19 | f | p | m | 2 |
| 20 | b | p | k | 1 |
| 21 | f | s | n | 1 |
| 22 | b | p | m | 1 |
| 23 | b | p | k | 1 |

1445:

| | | |
|---|---|---|
| B | p | -0.11 |
| B | s | -0.20 |
| B | t | -0.09 |
| B | g | -0.12 |
| C | k | -0.19 |
| C | m | -0.46 |
| C | n | -0.22 |

*  ← 1446

| | | |
|---|---|---|
| A | b | -0.01 |
| A | f | -0.01 |
| B | p | -0.09 |
| B | s | -0.09 |
| B | t | -0.14 |
| B | g | -0.38 |
| C | k | -0.20 |
| C | m | -0.39 |
| C | n | -0.18 |

④
| num | A | B | C | flavor |
|---|---|---|---|---|
| 1 | a | p | m | 2 |
| 2 | a | g | m | 10 |
| 3 | a | p | m | 11 |
| 4 | a | s | m | 2 |
| 5 | a | s | m | 10 |
| 6 | a | s | m | 4 |
| 7 | a | t | m | 11 |
| 8 | a | t | m | 2 |

~1448

| B | p | -0.22 |   |
|---|---|---|---|
| B | s | -0.36 | * |
| B | t | -0.22 |   |
| B | g | -0.29 |   |

⑤
| num | A | B | C | flavor |
|---|---|---|---|---|
| 1 | a | p | k | 11 |
| 2 | a | g | k | 4 |
| 3 | a | s | n | 11 |
| 4 | a | t | n | 11 |
| 5 | a | g | k | 11 |
| 6 | a | g | k | 11 |
| 7 | a | p | n | 11 |
| 8 | a | g | k | 11 |
| 9 | a | s | n | 11 |

~1449

⑥
| num | A | B | C | flavor |
|---|---|---|---|---|
| 1 | a | s | m | 2 |
| 2 | a | s | m | 10 |
| 3 | a | s | m | 4 |

⑦
| num | A | B | C | flavor |
|---|---|---|---|---|
| 1 | a | p | m | 2 |
| 2 | a | g | m | 10 |
| 3 | a | p | m | 11 |
| 4 | a | t | m | 11 |
| 5 | a | t | m | 2 |

| B | p | -0.17 |   |
|---|---|---|---|
| B | t | -0.17 |   |
| B | g | -0.72 | * |

⑧
| num | A | B | C | flavor |
|---|---|---|---|---|
| 1 | a | g | m | 10 |

⑨
| num | A | B | C | flavor |
|---|---|---|---|---|
| 1 | a | p | m | 2 |
| 2 | a | p | m | 11 |
| 3 | a | t | m | 11 |
| 4 | a | t | m | 2 |

⑩
| num | A | B | C | flavor |
|---|---|---|---|---|
| 1 | a | p | m | 2 |
| 2 | a | p | m | 11 |

⑪
| num | A | B | C | flavor |
|---|---|---|---|---|
| 1 | a | t | m | 11 |
| 2 | a | t | m | 2 |

⑫
| num | A | B | C | flavor |
|---|---|---|---|---|
| 1 | a | g | k | 4 |
| 2 | a | g | k | 11 |
| 3 | a | g | k | 11 |
| 4 | a | g | k | 11 |

⑬
| num | A | B | C | flavor |
|---|---|---|---|---|
| 1 | a | p | k | 11 |
| 2 | a | s | n | 11 |
| 3 | a | t | n | 11 |
| 4 | a | p | n | 11 |
| 5 | a | s | n | 11 |

Table 14:

| num | A | B | C | flavor |
|---|---|---|---|---|
| 1 | b | p | m | 1 |
| 2 | b | s | m | 2 |
| 3 | f | g | m | 2 |
| 4 | b | t | m | 2 |
| 5 | f | s | m | 4 |
| 6 | b | p | m | 1 |
| 7 | f | p | m | 2 |
| 8 | b | p | m | 1 |

| A | b | -0.45 |
|---|---|---|
| A | f | -0.45 |
| B | p | -0.59 |
| B | s | -0.41 |
| B | t | -0.14 |
| B | g | -0.14 |

*

Table 15:

| num | A | B | C | flavor |
|---|---|---|---|---|
| 1 | b | p | k | 1 |
| 2 | f | s | n | 1 |
| 3 | b | p | n | 10 |
| 4 | b | t | k | 4 |
| 5 | f | s | k | 1 |
| 6 | b | g | k | 10 |
| 7 | f | g | n | 10 |
| 8 | f | p | k | 4 |
| 9 | b | p | k | 1 |
| 10 | b | p | k | 4 |
| 11 | f | s | n | 1 |
| 12 | f | g | k | 10 |
| 13 | b | p | k | 1 |
| 14 | f | s | n | 1 |
| 15 | b | p | k | 1 |

Table 16:

| num | A | B | C | flavor |
|---|---|---|---|---|
| 1 | b | p | m | 1 |
| 2 | b | p | m | 1 |
| 3 | f | p | m | 2 |
| 4 | b | p | m | 1 |

Table 17:

| num | A | B | C | flavor |
|---|---|---|---|---|
| 1 | b | s | m | 2 |
| 2 | f | g | m | 2 |
| 3 | b | t | m | 2 |
| 4 | f | s | m | 4 |

Table 18:

| num | A | B | C | flavor |
|---|---|---|---|---|
| 1 | f | p | m | 2 |

Table 20:

| num | A | B | C | flavor |
|---|---|---|---|---|
| 1 | b | s | m | 2 |
| 2 | b | t | m | 2 |

Table 19:

| num | A | B | C | flavor |
|---|---|---|---|---|
| 1 | b | p | m | 1 |
| 2 | b | p | m | 1 |
| 3 | b | p | m | 1 |

Table 21:

| num | A | B | C | flavor |
|---|---|---|---|---|
| 1 | f | g | m | 2 |
| 2 | f | s | m | 4 |

Table 22:

| num | A | B | C | flavor |
|---|---|---|---|---|
| 1 | f | g | m | 2 |

Table 23:

| num | A | B | C | flavor |
|---|---|---|---|---|
| 1 | f | s | m | 4 |

| num | A | B | C | flavor |
|---|---|---|---|---|
| 1 | b | g | k | 10 |
| 2 | f | g | n | 10 |
| 3 | f | g | k | 10 |

| | | |
|---|---|---|
| A | b | -0.13 |
| A | f | -0.13 |
| B | p | -0.06 |
| B | s | -0.30 |
| B | t | -0.17 |
| B | g | -0.51 * |
| C | k | -0.14 |
| C | n | -0.14 |

(25)

| num | A | B | C | flavor |
|---|---|---|---|---|
| 1 | b | p | k | 1 |
| 2 | f | s | n | 1 |
| 3 | b | p | n | 10 |
| 4 | b | t | k | 4 |
| 5 | f | s | k | 1 |
| 6 | f | p | k | 4 |
| 7 | b | p | k | 1 |
| 8 | b | p | k | 4 |
| 9 | f | s | n | 1 |
| 10 | b | p | k | 1 |
| 11 | f | s | n | 1 |
| 12 | b | p | k | 1 |

| | | |
|---|---|---|
| A | b | -0.08 |
| A | f | -0.08 |
| B | p | -0.08 |
| B | s | -0.25 |
| B | t | -0.18 |
| C | k | -0.29 * |
| C | n | -0.28 |

(26)

| num | A | B | C | flavor |
|---|---|---|---|---|
| 1 | b | p | k | 1 |
| 2 | b | t | k | 4 |
| 3 | f | s | k | 1 |
| 4 | f | p | k | 4 |
| 5 | b | p | k | 1 |
| 6 | b | p | k | 4 |
| 7 | b | p | k | 1 |
| 8 | b | p | k | 1 |

(27)

| num | A | B | C | flavor |
|---|---|---|---|---|
| 1 | f | s | n | 1 |
| 2 | b | p | n | 1 |
| 3 | f | s | n | 1 |
| 4 | f | s | n | 1 |

(28)

| num | A | B | C | flavor |
|---|---|---|---|---|
| 1 | b | t | k | 4 |

(29)

| num | A | B | C | flavor |
|---|---|---|---|---|
| 1 | b | p | k | 1 |
| 2 | f | s | k | 1 |
| 3 | f | p | k | 4 |
| 4 | b | p | k | 1 |
| 5 | b | p | k | 4 |
| 6 | b | p | k | 1 |
| 7 | b | p | k | 1 |

(30)

| num | A | B | C | flavor |
|---|---|---|---|---|
| 1 | f | s | k | 1 |

(31)

| num | A | B | C | flavor |
|---|---|---|---|---|
| 1 | b | p | k | 1 |
| 2 | f | p | k | 4 |
| 3 | b | p | k | 1 |
| 4 | b | p | k | 4 |
| 5 | b | p | k | 1 |
| 6 | b | p | k | 1 |

(32)

| num | A | B | C | flavor |
|---|---|---|---|---|
| 1 | b | b | k | 1 |
| 2 | b | p | k | 1 |
| 3 | b | p | k | 4 |
| 4 | b | p | k | 1 |
| 5 | b | p | k | 1 |

(33)

| num | A | B | C | flavor |
|---|---|---|---|---|
| 1 | f | p | k | 4 |

FIG. 14F

| num | A | B | C | flavor |
|---|---|---|---|---|
| 1 | a | p | k | 11 |
| 2 | a | p | m | 11 |
| 3 | a | p | n | 11 |
| 4 | a | s | m | 10 |
| 5 | a | s | n | 11 |
| 6 | a | t | m | 11 |
| 7 | a | t | n | 11 |
| 8 | a | g | k | 11 |
| 9 | a | g | m | 10 |
| 10 | b | p | k | 4 |
| 11 | b | p | m | 1 |
| 12 | b | p | n | 10 |
| 13 | b | s | m | 2 |
| 14 | b | t | k | 4 |
| 15 | b | t | m | 2 |
| 16 | b | g | k | 10 |
| 17 | f | p | k | 4 |
| 18 | f | p | m | 2 |
| 19 | f | s | k | 1 |
| 20 | f | s | m | 4 |
| 21 | f | s | n | 1 |
| 22 | f | g | k | 10 |
| 23 | f | g | m | 2 |
| 24 | f | g | n | 10 |

1504 (table), 1506 (row marker)

FIG. 15B

AUTOMATED METHODS AND SYSTEMS THAT PROVIDE RESOURCE RECOMMENDATIONS FOR VIRTUAL MACHINES

TECHNICAL FIELD

The current document is directed to distributed-computer-systems and distributed applications and, in particular, to methods and systems that generate recommendations for resource specifications used in virtual-machine-hosting requests.

BACKGROUND

During the past seven decades, electronic computing has evolved from primitive, vacuum-tube-based computer systems, initially developed during the 1940s, to modern electronic computing systems in which large numbers of multiprocessor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed, and as general hardware and software technologies continue to advance, the current trend towards ever-larger and more complex distributed computing systems appears likely to continue well into the future.

As the complexity of distributed computing systems has increased, the management, administration, and use of distributed computing systems has, in turn, become increasingly complex, with management and administration involving greater computational overheads and significant inefficiencies and deficiencies. In fact, many desired management-and-administration functionalities are becoming sufficiently complex to render traditional approaches to the design and implementation of automated management and administration systems impractical, from a time and cost standpoint, and even from a feasibility standpoint. Access to, and use of, distributed computer systems has also become increasingly complex. Therefore, designers and developers of various types of automated management-and-administration facilities and distributed-computer-system interfaces continue to seek new approaches to implementing automated management-and-administration facilities and functionalities and distributed-computer-system interfaces.

SUMMARY

The current document is directed to methods and systems that generate recommendations for resource specifications used in virtual-machine-hosting requests. When distributed applications are submitted to distributed-computer-system-based hosting platforms for hosting, the hosting requester generally specifies the computational resources that will need to be provisioned for each virtual machine included in a set of virtual machines that correspond to the distributed application, such as the processor bandwidth, memory size, local and remote networking bandwidths, and data-storage capacity needed for supporting execution of each virtual machine. In many cases, the hosting platform reserves the specified computational resources and accordingly charges for them. However, in many cases, the specified computational resources significantly exceed the computational resources actually needed for hosting the distributed application. The currently disclosed methods and systems employ machine learning to provide accurate estimates of the computational resources for the VMs of a distributed application.

BRIEF DESCRIPTION OF THE DRAWINGS

FIGS. 14A-F illustrate construction of a decision tree.

FIGS. 15A-B illustrate a second decision tree and the dataset from which the second decision tree is generated.

DETAILED DESCRIPTION

Figure 1:
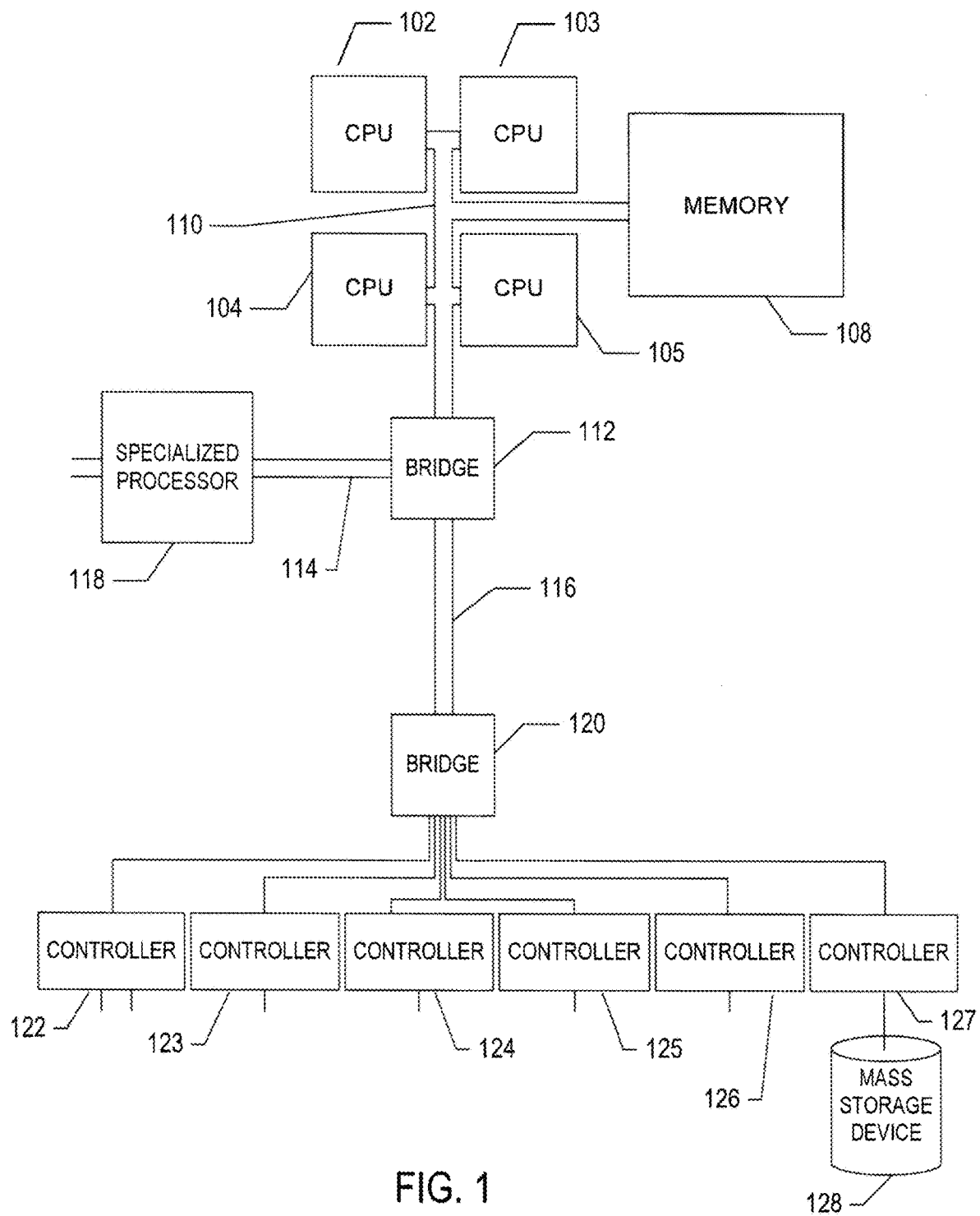
FIG. 1 provides a general architectural diagram for various types of computers.

The current document is directed to methods and systems that generate recommendations for resource specifications used in virtual-machine-hosting requests. In a first subsection, below, a detailed description of computer hardware, complex computational systems, and virtualization is provided with reference to FIGS. 1-10. A second subsection discusses the currently disclosed methods and systems, with reference to FIGS. 11-18.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories. the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
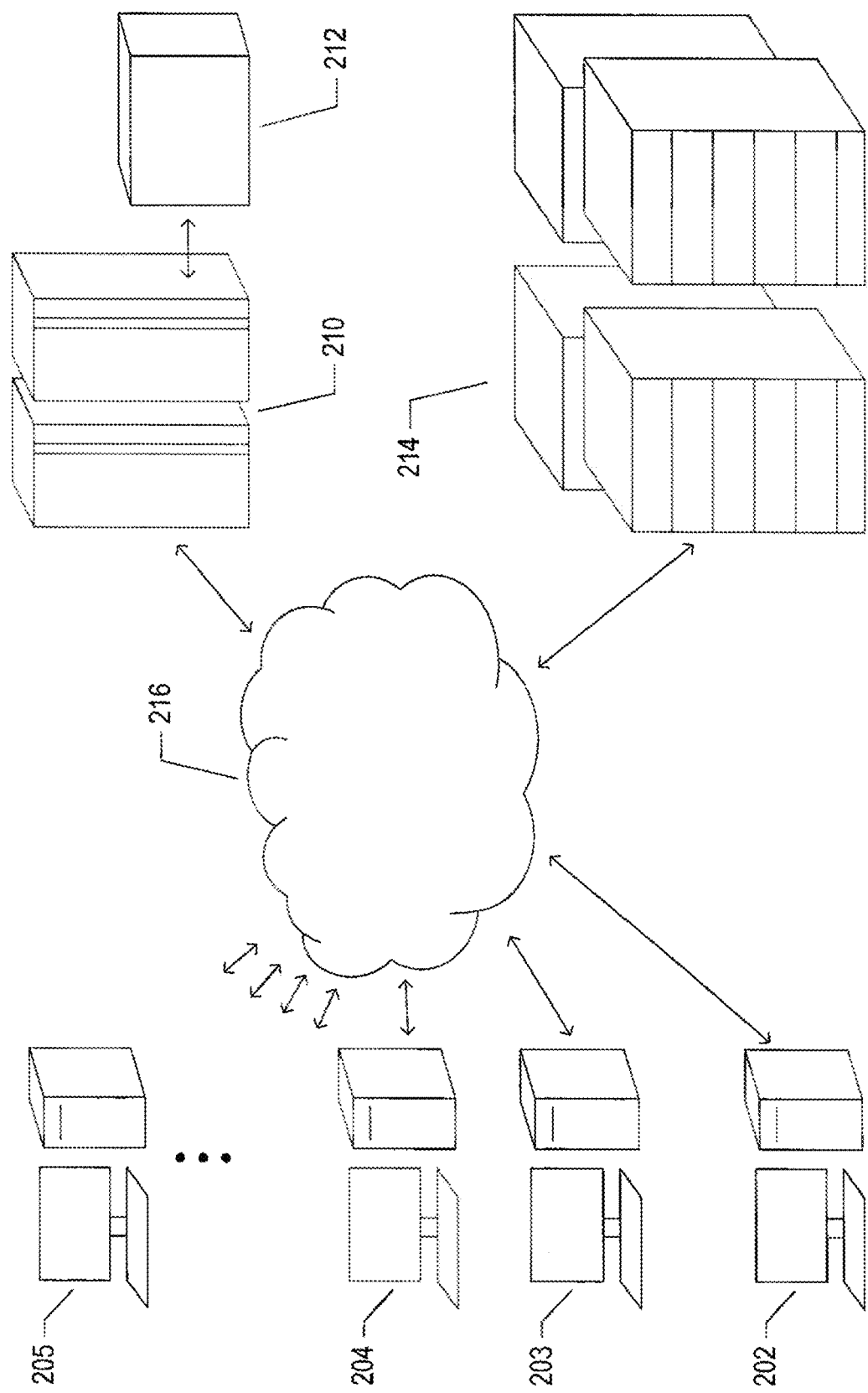
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
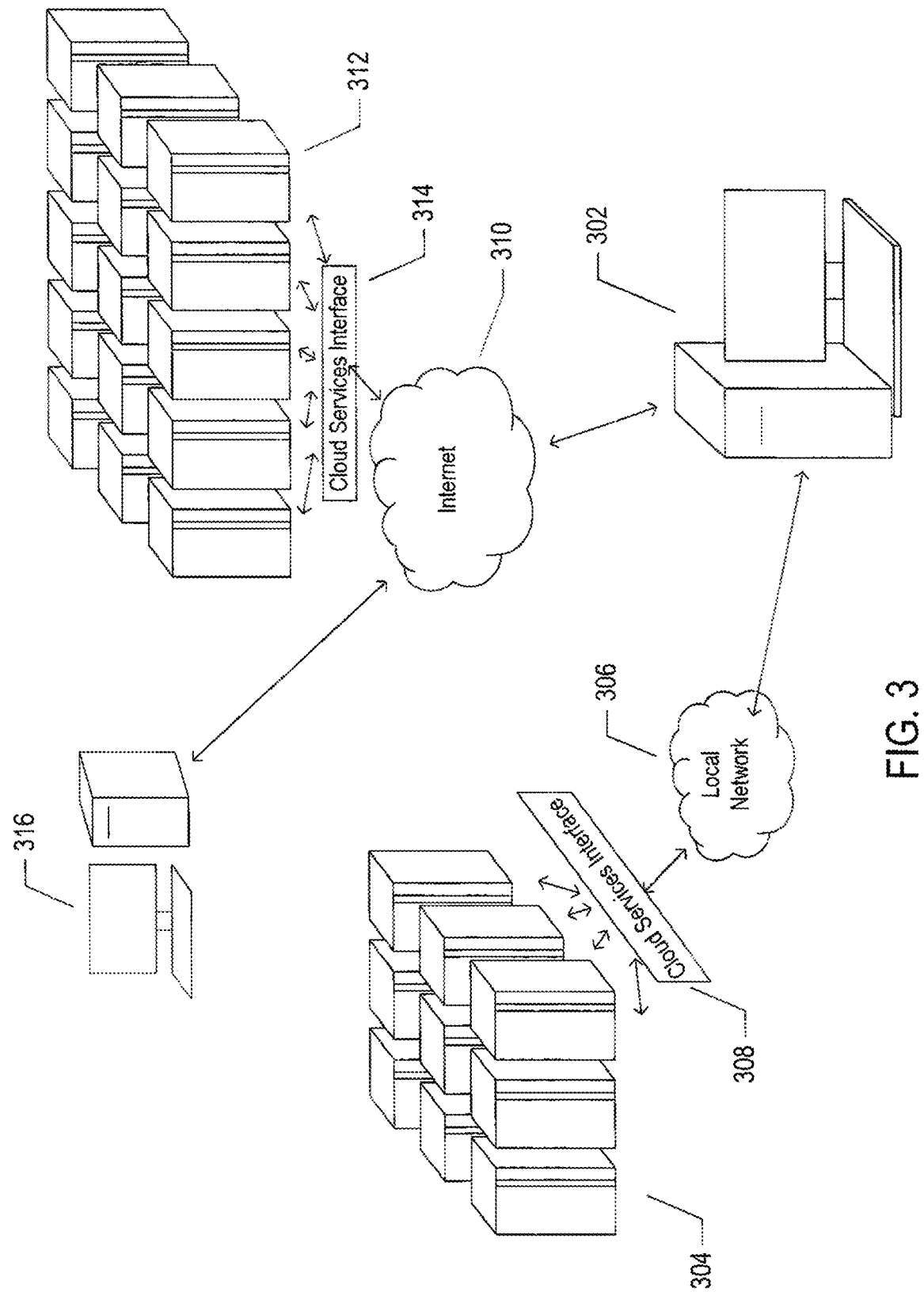
FIG. 3 illustrates cloud computing.

FIG. 3 illustrates cloud computing. In the recently developed cloud-computing paradigm, computing cycles and data-storage facilities are provided to organizations and individuals cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
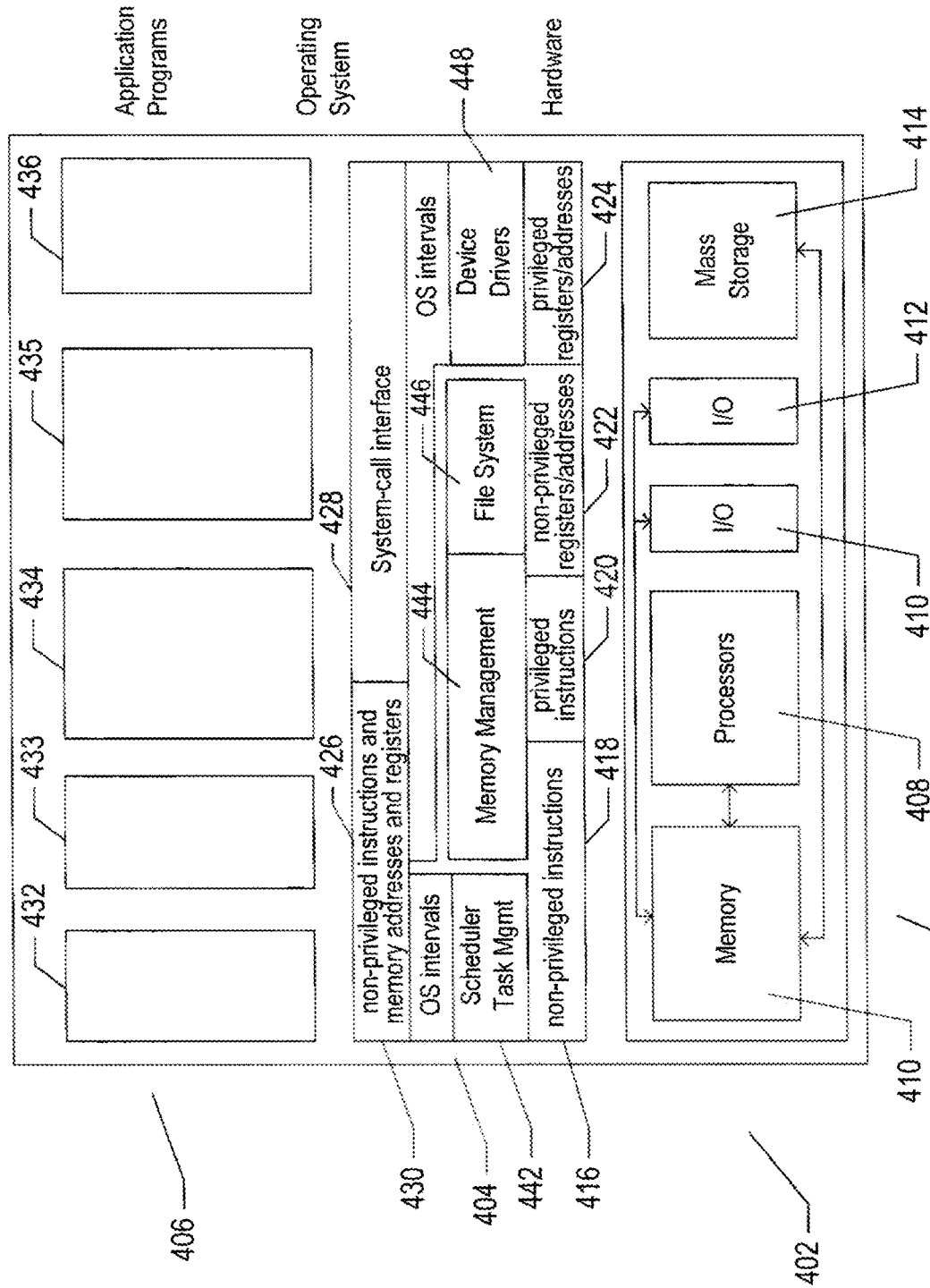
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
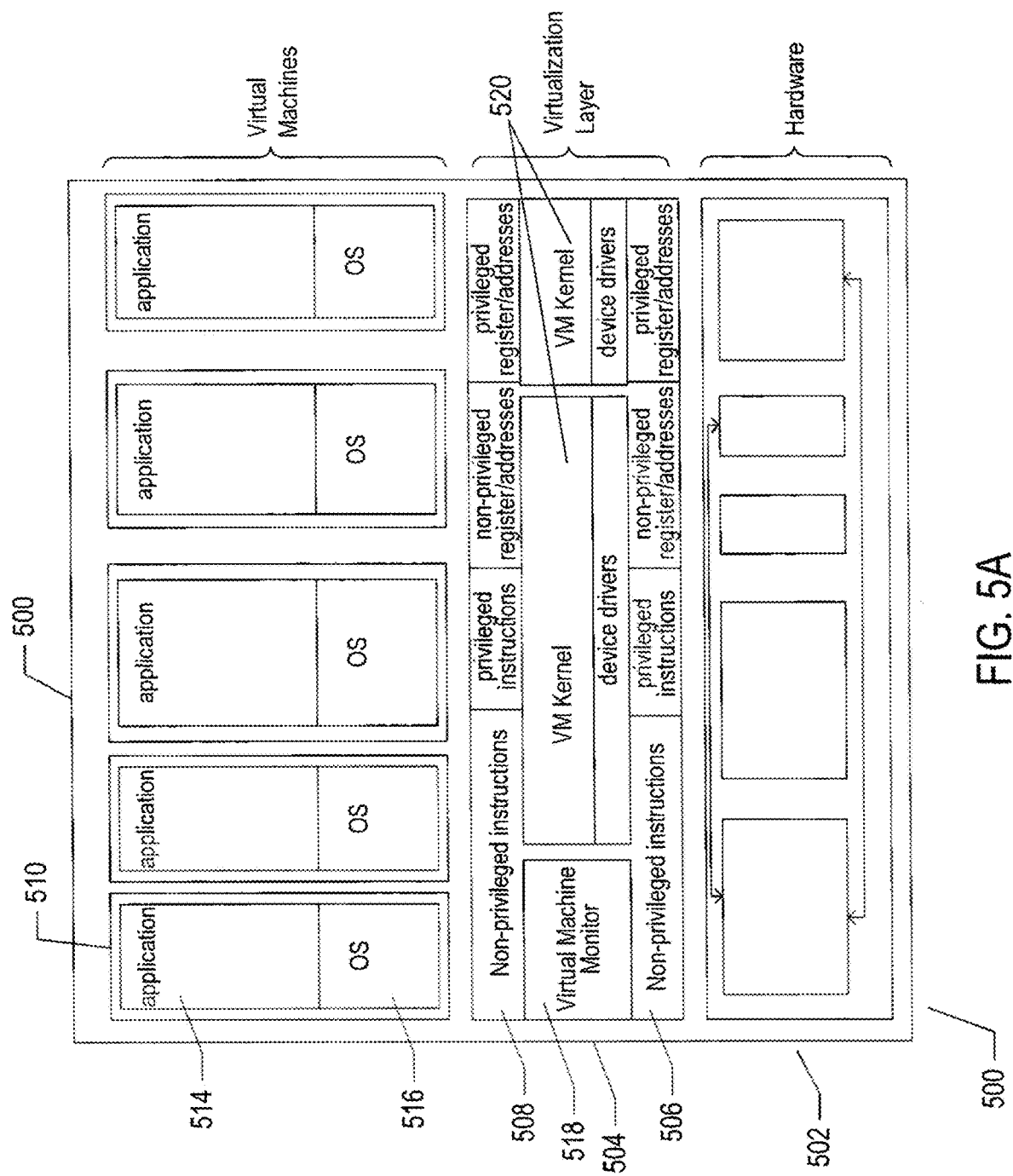
FIGS. 5A-D illustrate two types of virtual machine and virtual-machine execution environments.
Figure 5B:
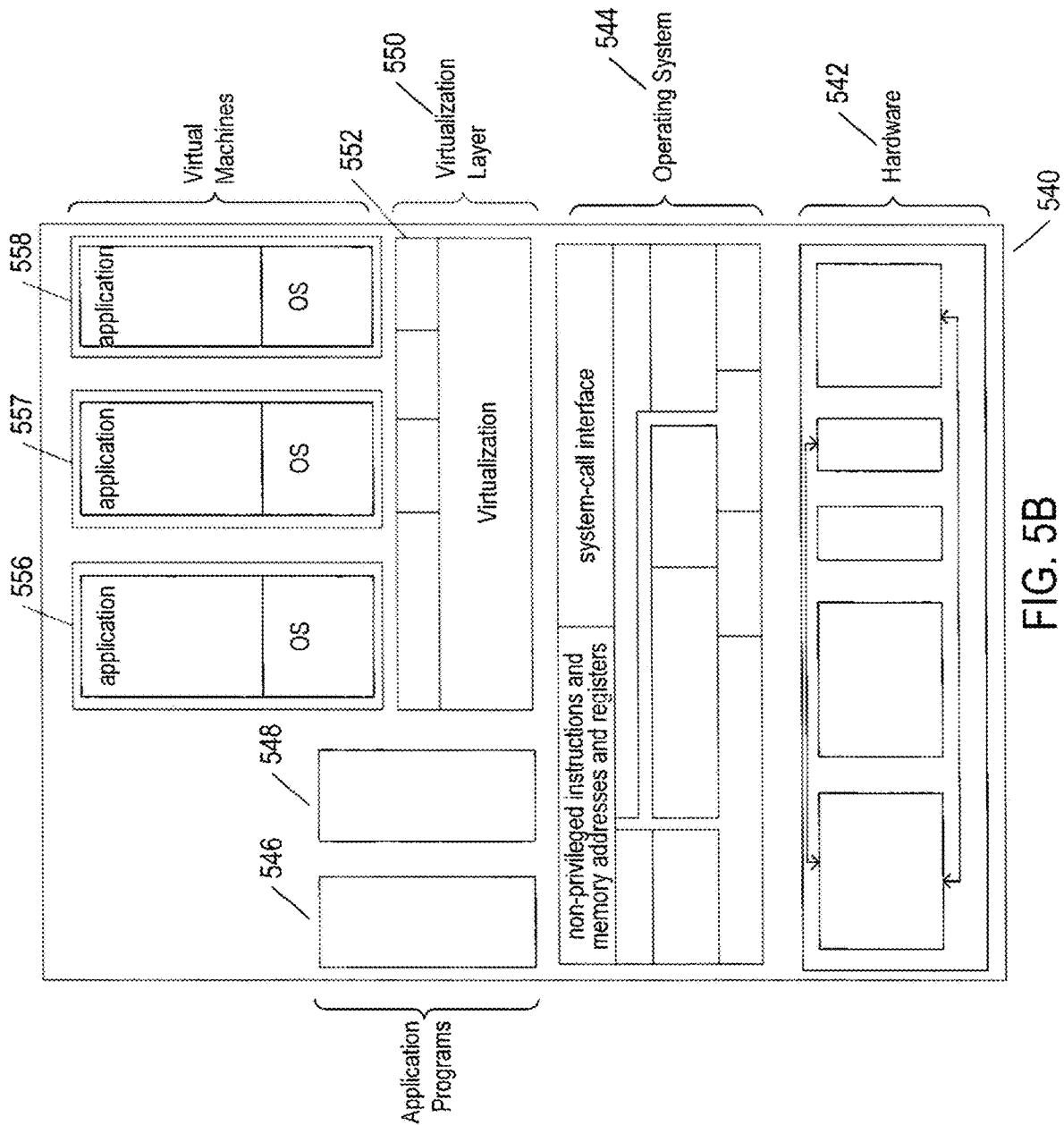

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads.

Figure 5C:
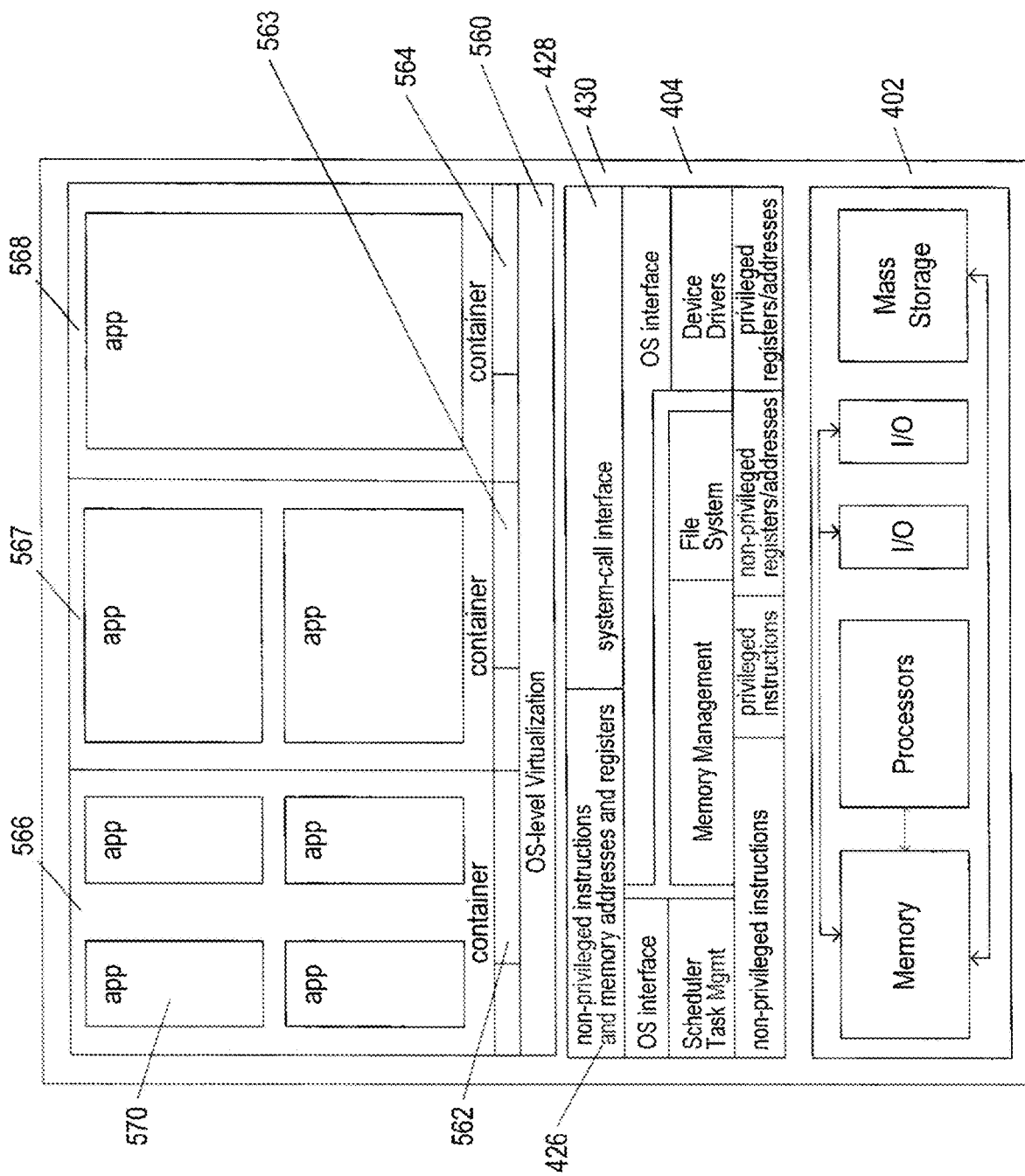

While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as namespace support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
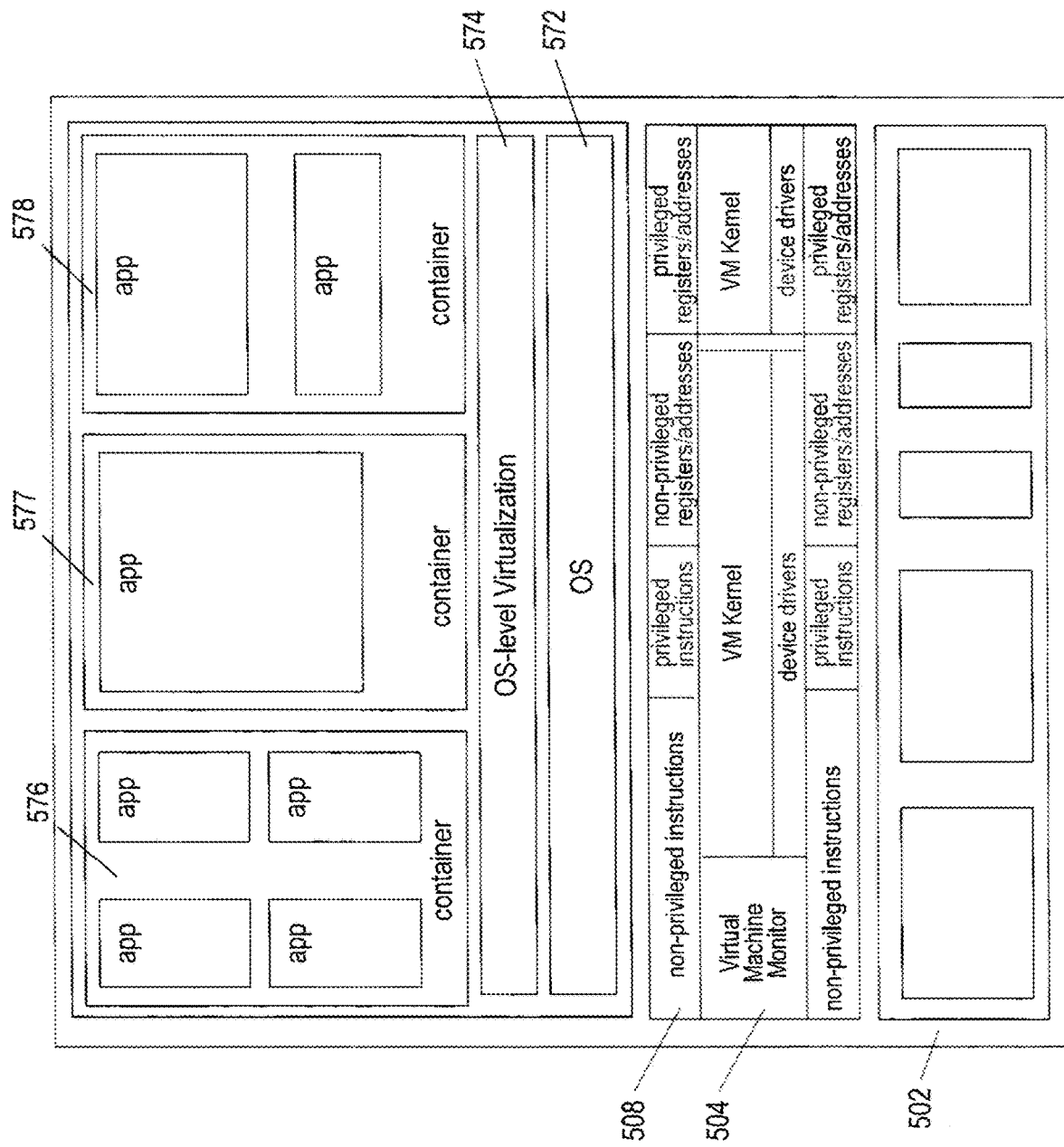

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
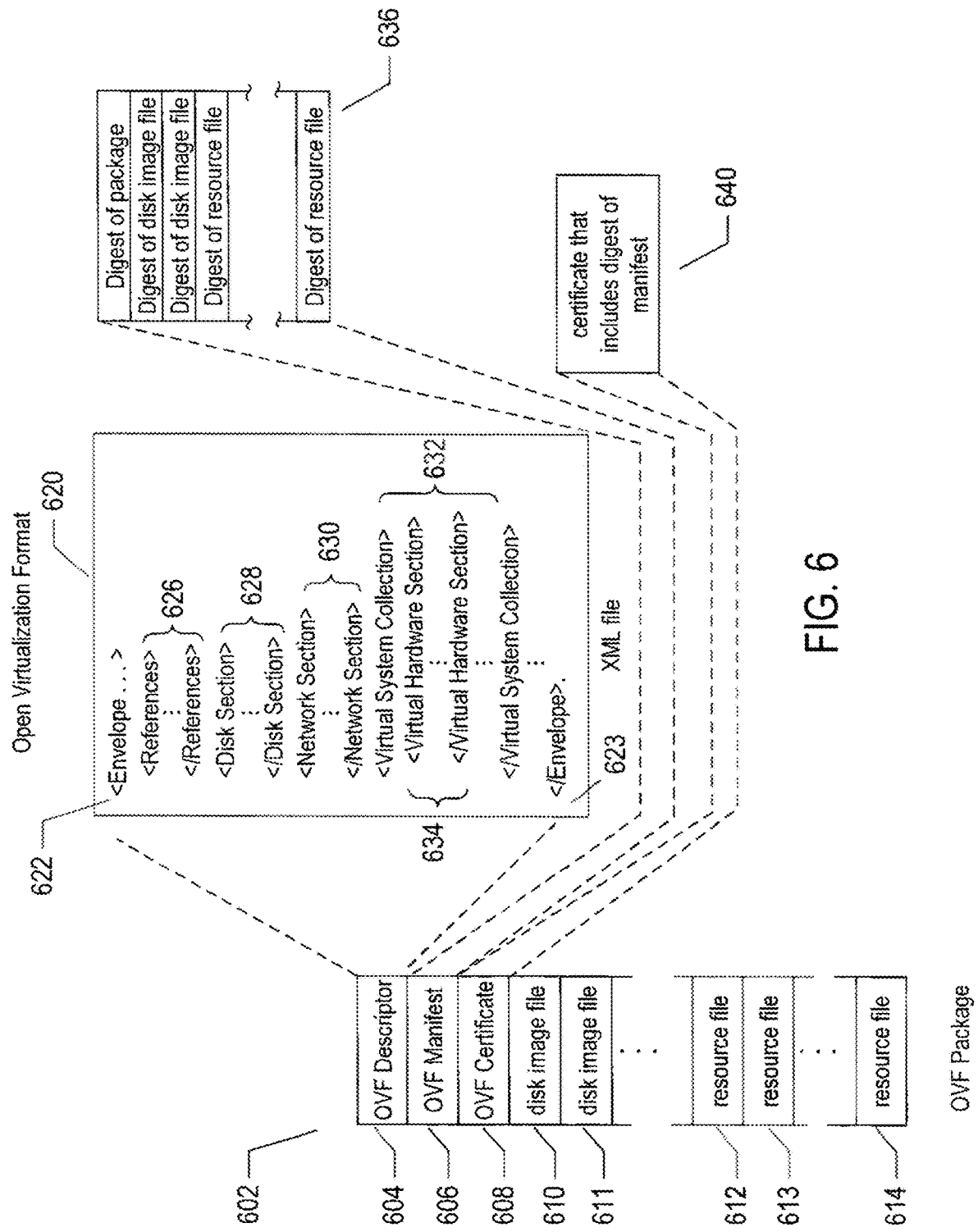
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
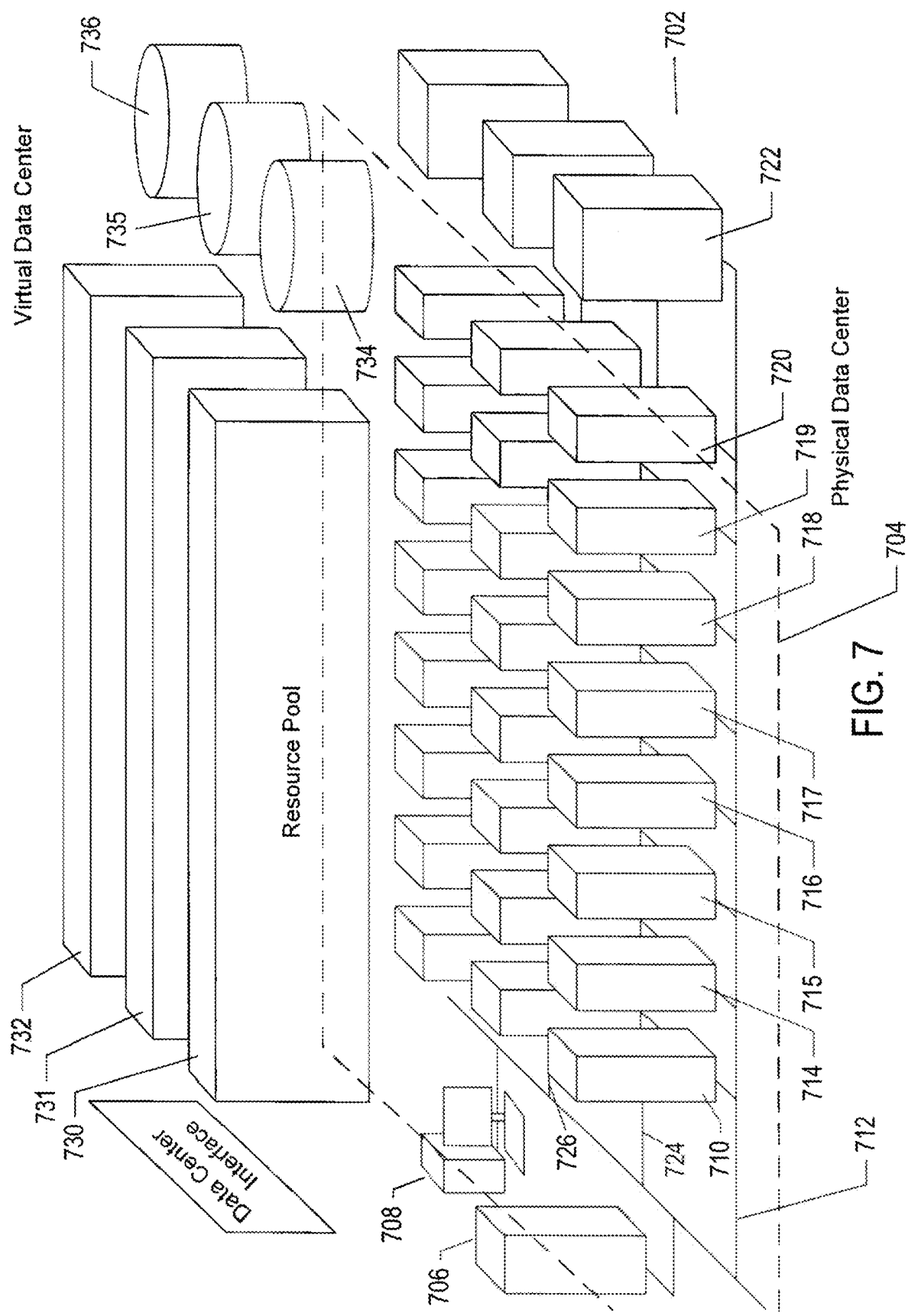
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
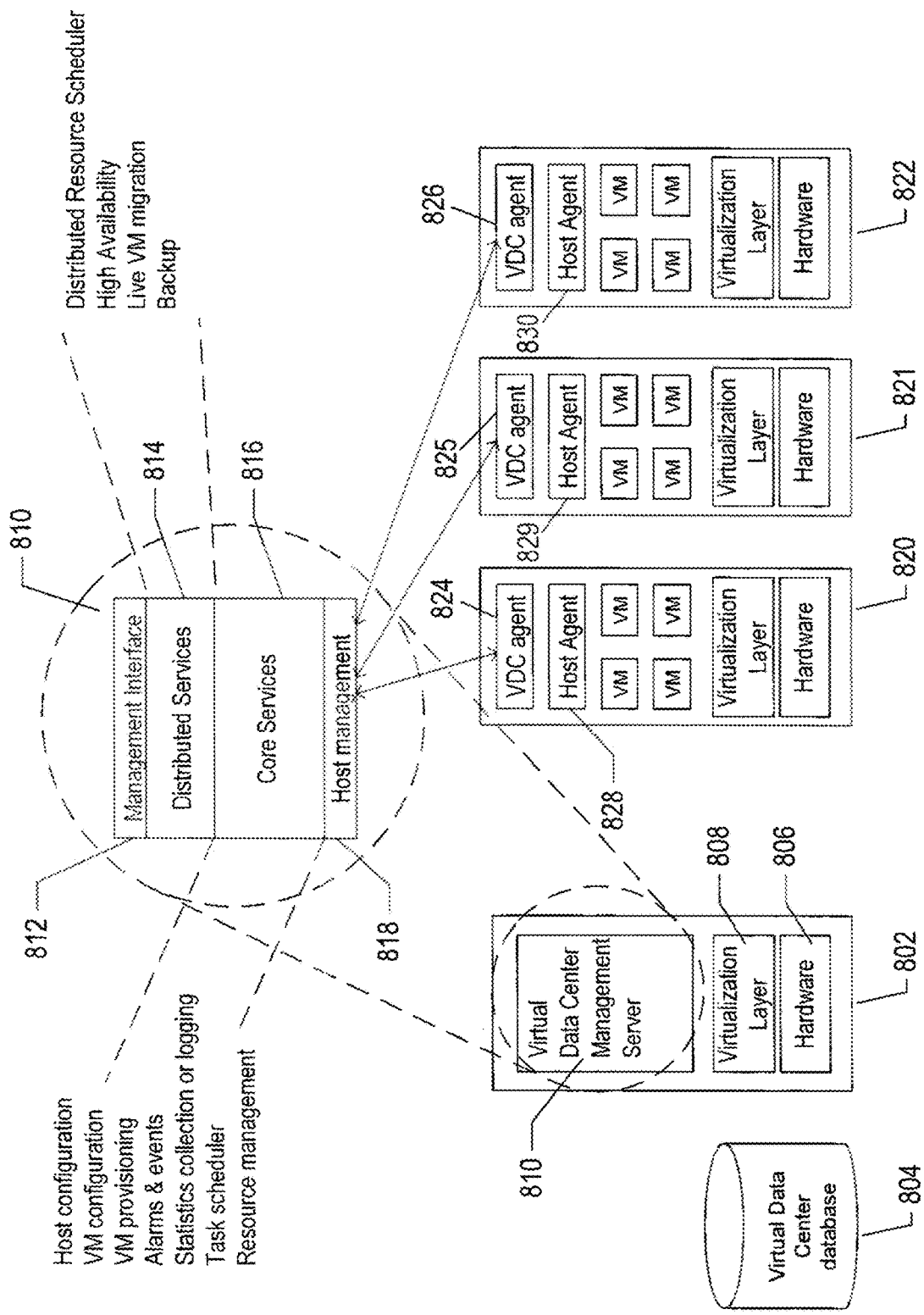
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
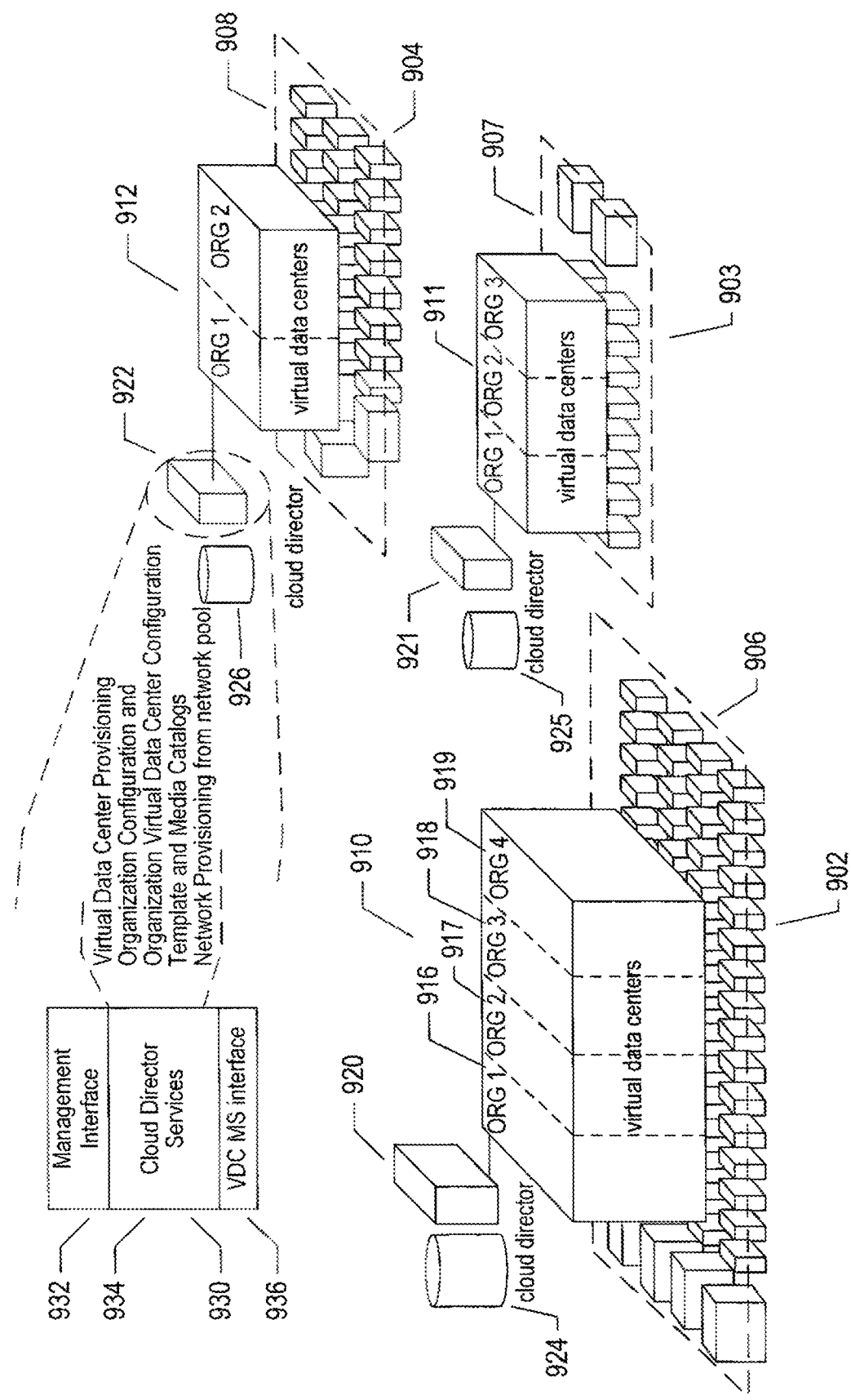
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
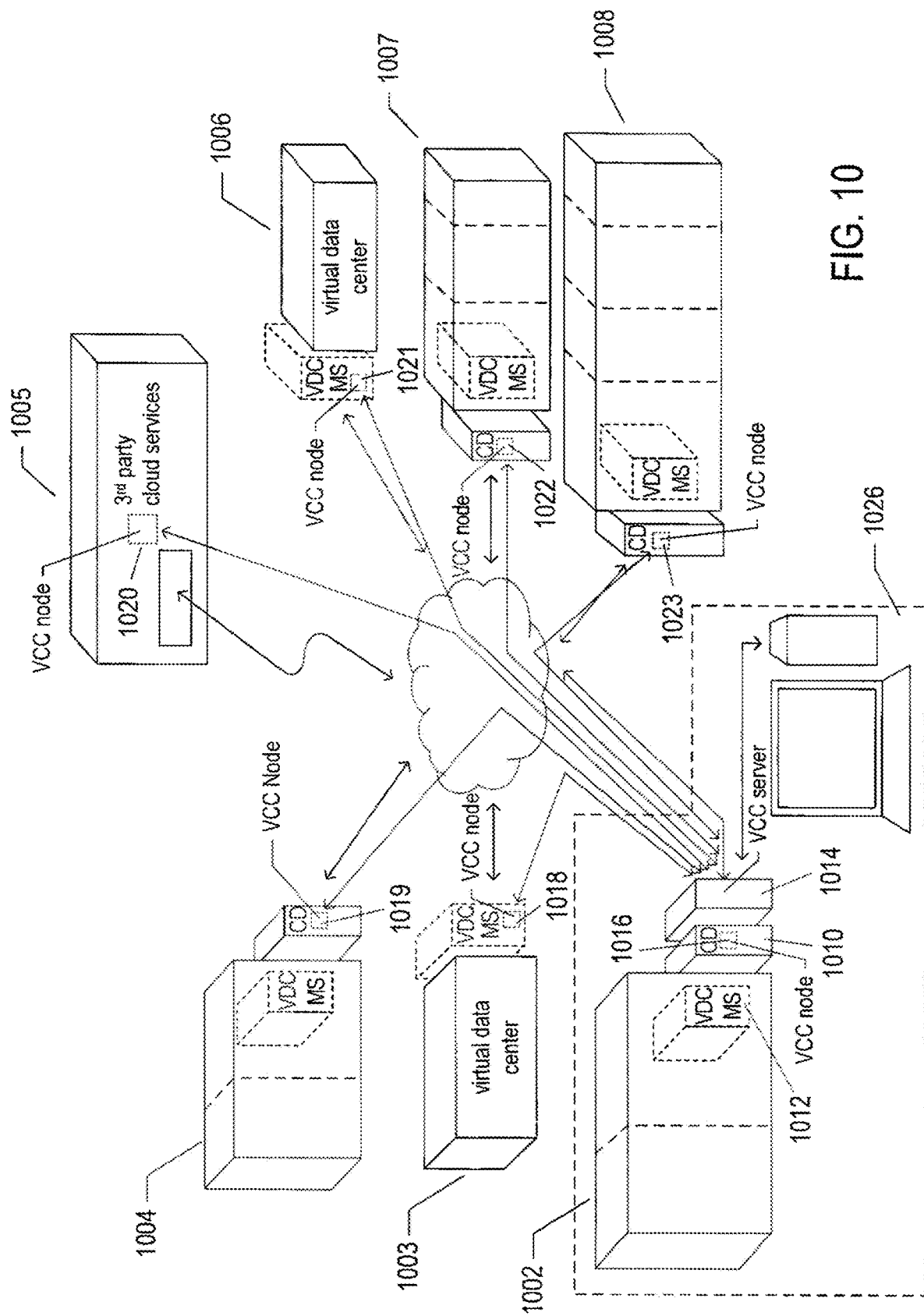
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Currently Disclosed Methods and Systems

Figure 11A:
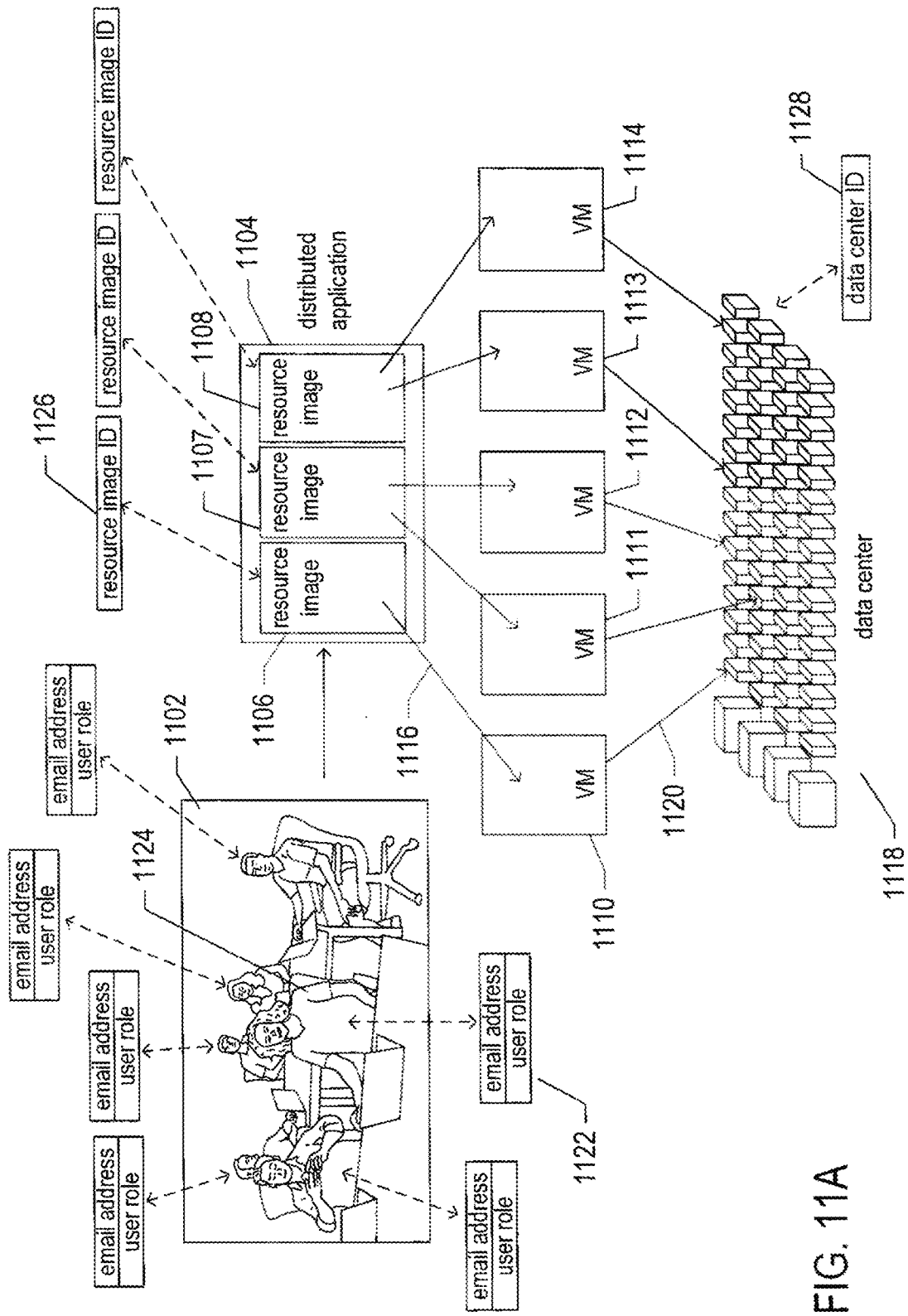
FIGS. 11A-B illustrate various attributes associated with a distributed application.
Figure 11B:
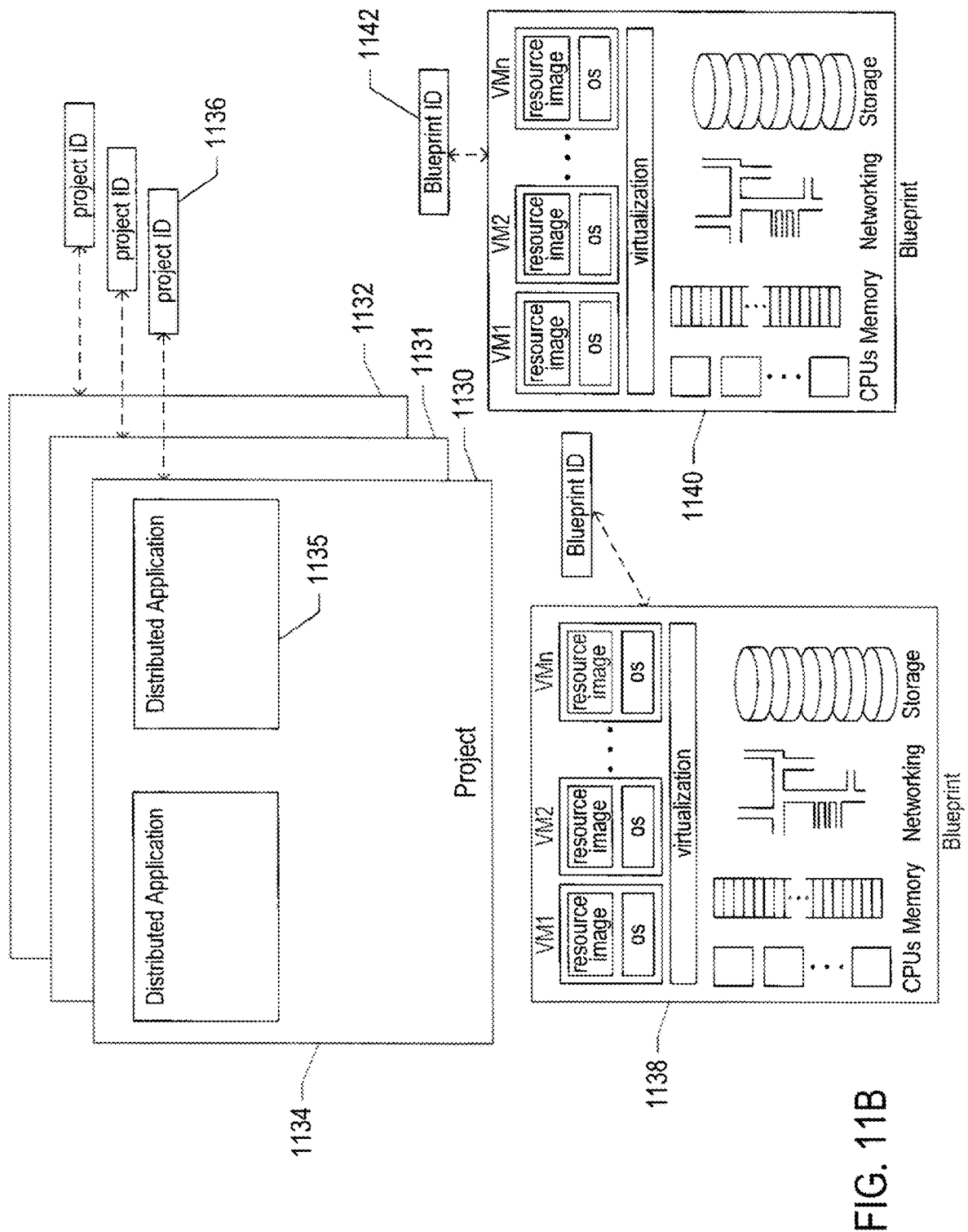

FIGS. 11A-B illustrate various attributes associated with a distributed application. A distributed application is generally developed by a development team 1102. The development team includes numerous human developers who carry out one or more roles or task sets during the development of distributed applications. A distributed application 1104 generally consists of a number of different resource images 1106-1108, in the example illustrated in FIGS. 11A-B, that each comprises one or more programs or executables and an execution environment. Each resource image is instantiated in one or more virtual machines that run within one or more distributed computer systems and that cooperate to provide the functionalities associated with the distributed application, such as the functionalities associated with application-programming-interface ("API") entrypoints. For example, a simple distributed application may include front-end, middle-layer, and backend executables that are each instantiated multiple times in multiple different servers within a distributed computer system. For modern distributed applications, resource-image instances are mapped to a set of virtual machines ("VMs") 1110-1114, as indicated by a first set of arrows, such as arrow 1116, and the virtual machines are then submitted for hosting by a data center or cloud-computing facility 1118, as indicated by a second layer of arrows, including arrow 1120. Each developer in the development team may be identified by an email-address/user-role-identifier pair, such as identifier pair 1122 for developer 1124. Each resource image included in the distributed application is identified by a resource-image identifier, such as resource-image identifier 1126 associated with resource image 1106. The cloud-computing facility or data center that hosts the distributed application is identified by a data-center identifier 1128. Turning to FIG. 11B, a development team generally develops distributed applications within the context of a project. An organization that employs a development team may develop distributed applications in the contexts of multiple different projects. Thus, as shown in FIG. 11B, there may be multiple projects 1130-1132 with respect to which the organization is currently developing distributed applications, and each project may include multiple different distributed applications, such as distributed applications 1134-1135 associated with project 1130. Each project may be associated with a project identifier, such as project identifier 1136 associated with project 1130. In many cases, a distributed application is described by a blueprint. In FIG. 11B, blueprint 1138 describes distributed application 1134 and blueprint 1140 describes distributed application 1135. A blueprint describes the components and topology of a distributed application as well as a mapping of the components to virtual and physical infrastructure. Various descriptive languages have been developed for constructing blueprints along with graphical blueprint-construction interfaces. Distributed-application blueprints may serve as specifications input to distributed-application deployment and management services. As shown in FIG. 11B, each blueprint is identified by a blueprint identifier, such as blueprint identifier 1142 associated with blueprint 1140.

Figure 12:
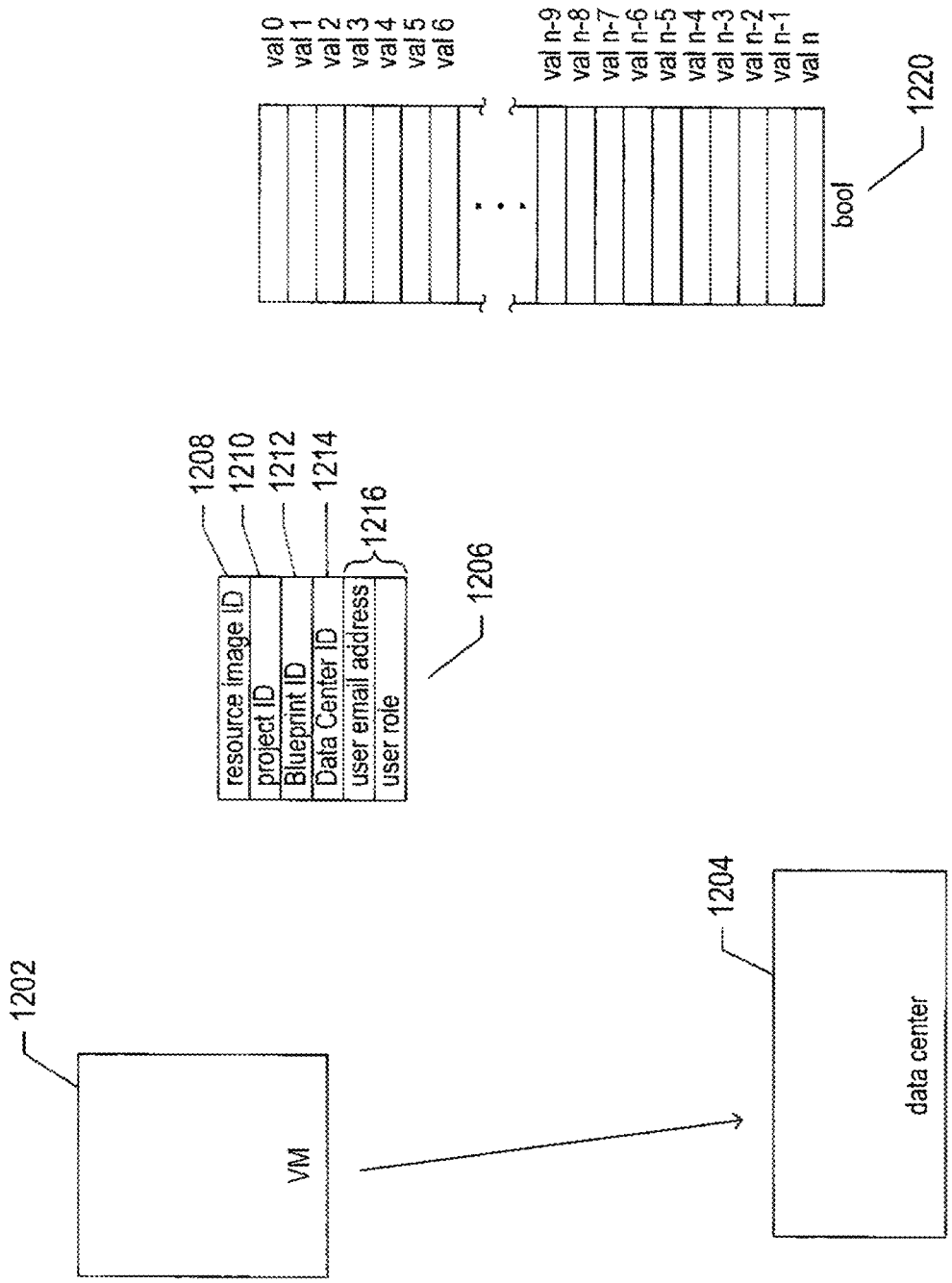
FIG. 12 illustrates an attribute-based characterization of a virtual machine.

FIG. 12 illustrates an attribute-based characterization of a virtual machine. In FIG. 12, virtual machine 1202 is intended to be hosted on data center 1204 as part of a set of virtual machines corresponding to distributed application. The virtual machine can be characterized by a set of attributes 1206. These include a resource-image identifier for the resource image instantiated within the virtual machine 1208, a project identifier 1210 for the project associated with a distributed application that includes the virtual machine, a blueprint identifier for the distributed application 1212, an identifier for the data center on which the virtual machine will be hosted 1214, and the email-address/role pair 1216 for the developer submitting the virtual machine for hosting. This is but one example of a set of attributes that might be used to characterize a virtual machine to which executables of a distributed application will be mapped for hosting by a data center or cloud-computing facility. In certain implementations, each of the attributes has one of multiple different attribute values, with each attribute value represented by a bit vector 1220. The length of the bit vector is equal to the number of different values that a particular attribute may have, and a particular attribute value is represented by a bit vector in which one element corresponding to the particular attribute value is set to Boolean value "1" and all other elements are set to Boolean value "0."

Figure 13A:
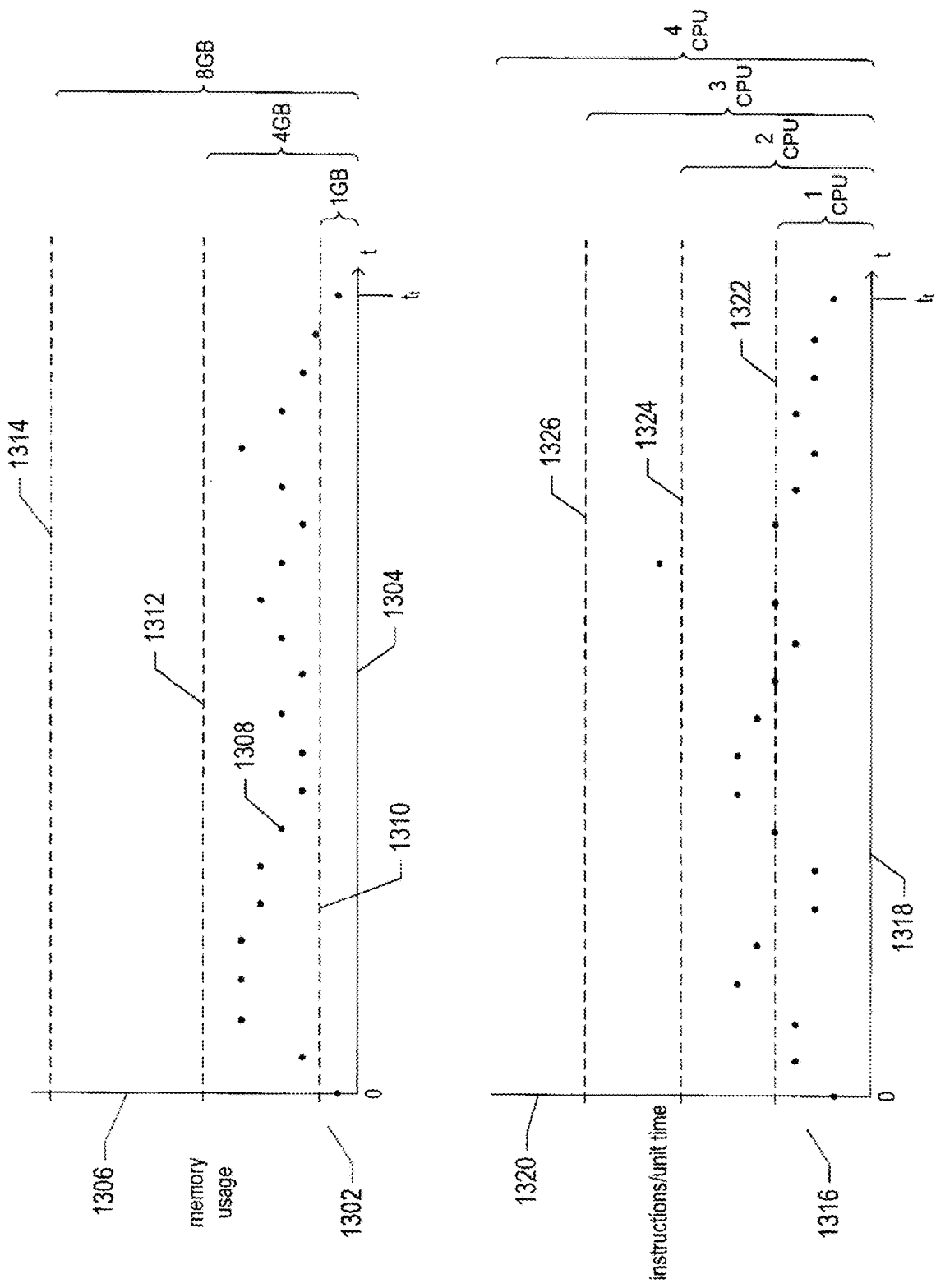
FIGS. 13A-C illustrate mapping of a virtual machine to one or more quantized resource-size or resource-capacity values.
Figure 13B:
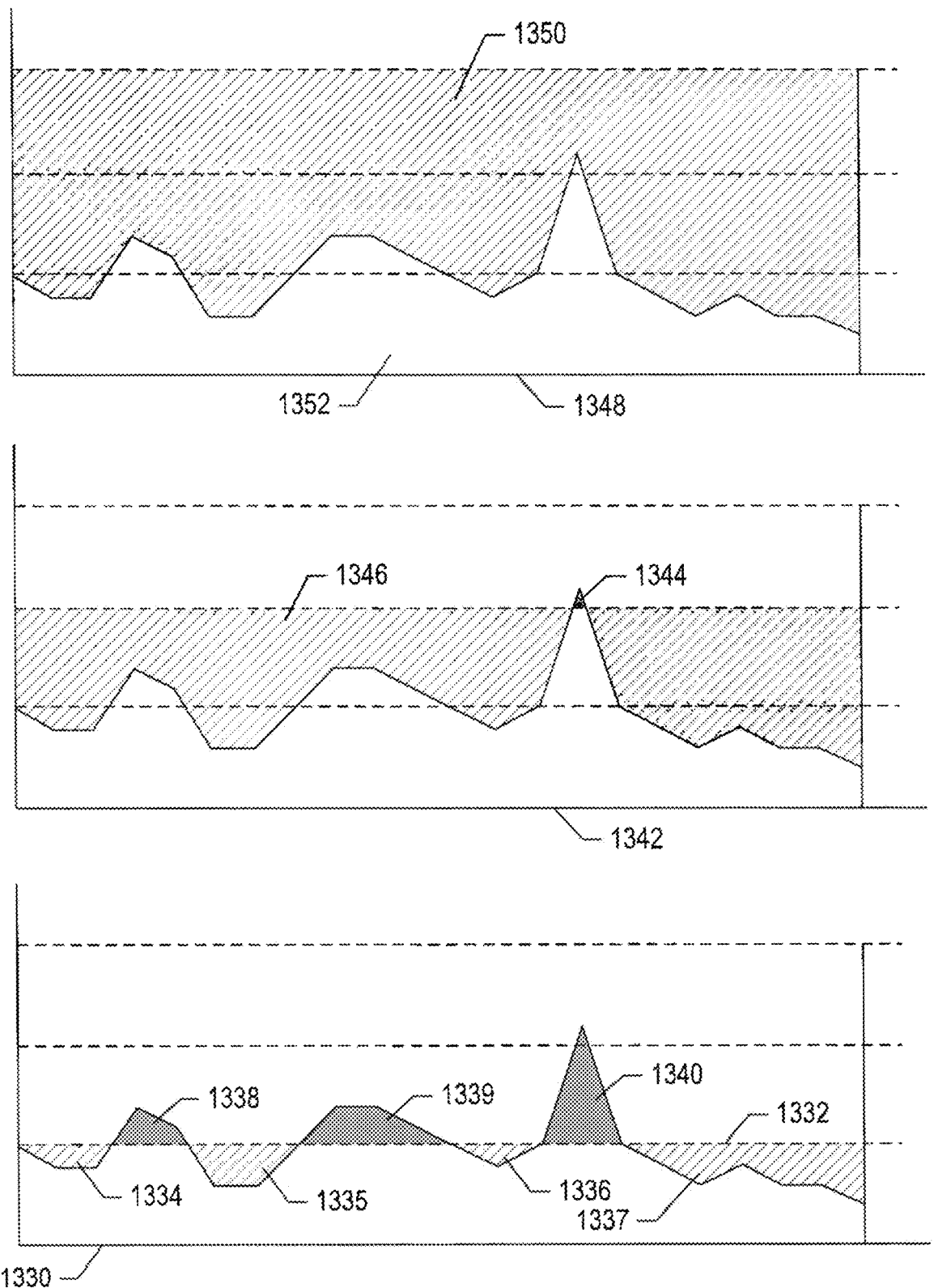
Figure 13C:
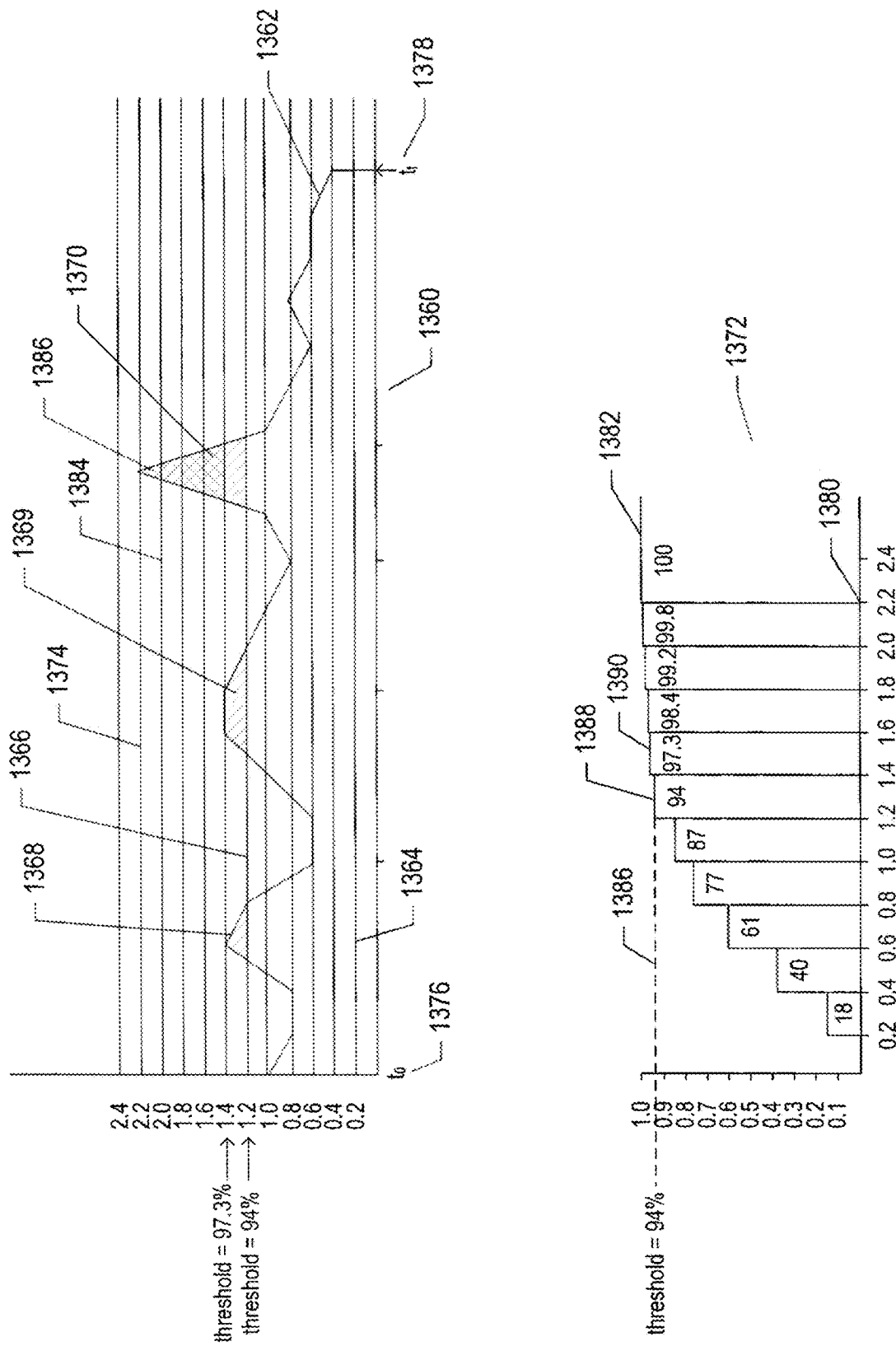

FIGS. 13A-C illustrate mapping of a virtual machine to one or more quantized resource-size or resource-capacity values. As mentioned above, a virtual machine, when hosted on a distributed computer system, consumes various types of computational resources. In the current discussion, only two of these types of resources are considered, although the methods and systems discussed below can be employed to consider any number of different types of computational resources. In the current discussion, the amount of memory used by a virtual machine and the processing bandwidth used by the virtual machine are considered. The amount of memory used by a virtual machine is generally expressed in terms of bytes, but, when the amount of memory expected to be needed by a virtual machine is specified in a hosting request, the needed memory is generally specified as an integral number of gigabytes ("GB"), such as 1 GB, 2 GB, 4 GB, 8 GB, 16 GB, 32 GB, and 64 GB. Thus, while the amount of memory used by a virtual machine may be more or less accurately expressed in terms of bytes, a set of quantized values is used to specify the amount of the memory resource to be allocated or reserved for a virtual machine. Similarly, the processing bandwidth needed by a virtual machine can be measured in terms of computer instructions executed per time unit, such as instructions per second. However, when specifying the needed processing bandwidth in a hosting request, the needed processing bandwidth is generally specified in terms of a needed number of standardized central processing units ("CPUs"), each of which represents a fixed processing bandwidth.

The needed amount of memory and the needed number of standardized CPUs for a virtual machine can be estimated from performance metrics accumulated during previous executions of the virtual machine. FIG. 13A illustrates the memory consumption and processing-bandwidth consumption of a particular VM during one historical execution or hosting of the VM. The first plot 1302 shown in FIG. 13A represents memory consumption, over time, by a particular VM. The horizontal axis 1304 represents time and the vertical axis 1306 represents the total amount of memory used by the VM. The plotted data points, such as data point 1308, indicate the amount of memory consumed by the VM at a particular point in time. Dashed lines, such as dashed line 1310, represent the quantized memory values. For example, dashed line 1310 may represent 1 GB of memory, dashed line 1312 may represent 4 GB of memory, and dashed line 1314 may represent 8 GB of memory. Similarly, the lower plot 1316 in FIG. 13A represents processing-bandwidth consumption by a VM. Again the horizontal axis 1318 represents time and the vertical axis 1320 represents the number of executed computer instructions per second. The horizontal dashed lines represent the processing bandwidths corresponding to different numbers of quantized standardized CPU values. Dashed line 1322 represents 1 standardized CPU, dashed line 1324 represents 2 standardized CPUs, and dashed line 1326 represents 3 standardized CPUs.

FIG. 13B illustrates the implications of specifying different numbers of standardized CPUs for the VM for which plot 1316 in FIG. 13A represents historical processing-bandwidth-consumption values. A first plot in FIG. 13B 1330 represents specification of 1 standardized CPU for hosting the VM by shading in regions above and below a processing-bandwidth-consumption curve corresponding to the data points in plot 1317 shown in FIG. 13A. When the processing-bandwidth used by the VM is less than the dashed line 1332 representing 1 standardized CPU, indicated by line-shaded regions 1334-1337 in FIG. 13B, the specified processing-bandwidth value is underutilized by the VM. When the processing bandwidth used by the VM exceeds the dashed line 1332 representing the specified 1 standardized CPU, as indicated by darkly shaded regions 1338-1340, the processing-bandwidth needs of the VM represent overutilization of the specified 1 standardized CPU. In general, the VM does not necessarily fail when the needed processing bandwidth exceeds an allocated processing bandwidth. Instead, the VM may begin to run noticeably slower, due to thrashing between in-memory data and data stored on mass-storage devices, as indicated by various metrics such as the number of client requests carried out per time unit, the average response time with respect to client requests, and other such metrics. Alternatively, a hosting platform may increase processing bandwidth allocated to the VM and charge additional hosting fees for doing so. For the particular VM with processing-bandwidth usage indicated by plot 1316 in FIG. 13A, specifying 1 standardized CPU in a hosting request for the VM would result in significant degradation of the throughput of the VM due to the significant portion of time during which the VM would be expected to overutilize the processing-bandwidth resources or, alternatively, might result in much higher than expected hosting fees. By contrast, as shown in plot 1342, were 2 standardized CPUs specified, then only a tiny fraction 1344 of the duration of execution of the VM would correspond to overutilization of the processing-bandwidth resource. Note, however, that the amount of underutilization of the processing-bandwidth resource, represented by the line-shaded area 1346, greatly increases. Plot 1348 represents specification of 3 CPUs for hosting the VM. In this case, the processing-bandwidth resources are never overutilized by the VM, but the processing-bandwidth resources allocated to the VM are always underutilized, and the total amount of underutilization represents a much larger fraction of the processing-bandwidth resources than the total amount of of the processing-bandwidth resources, as can be seen by contrasting the line-shaded area 1352 to the unshaded area below the processing-bandwidth-utilization curve 1352.

One important reason for automatically generating estimated computational-resource needs, by the currently disclosed methods and systems, for hosted virtual machines is to prevent underutilization of computational resources allocated to distributed applications based on the computational-resource needs specified for the virtual machines to which the distributed application is mapped in a distributed-application hosting request. Underutilization of computational resources represents a significant financial overhead to organizations that host distributed applications on distributed-computer-system-based hosting platforms. Current estimates indicate that many billions of dollars are wasted in paying for underutilized and idle computational resources as a result of specifying greater than needed computational-resource capacities and/or sizes in hosting requests for distributed applications. An organization might attempt to avoid these financial overheads by specifying minimal computational-resource needs and hosting requests, but, as discussed above, this would lead to increased distributed-application failure rates and degradation of distributed-application latencies and throughputs, which are also associated with significant financial overheads. Underutilized and idle resources are also problematic for cloud-computing-facility and data-center owners and administrators, because the underutilized and idle computational resources must be purchased and maintained, and these costs increase the fees for hosting distributed applications, as a result of which the demand for hosting may be depressed.

For all of these reasons, accurate estimates for the computational-resource needs of virtual machines hosted to support execution of a distributed application are vital, and, currently, there are not accurate and cost-effective methods and systems for providing these computational-resource-need estimates. It should be noted that the computational-resource-need estimation methods carried out by the currently disclosed systems are far too complex to be carried out manually or by mental processes. Thus, only automated computational-resource-need estimation methods can produce the accurate estimates needed to address the idle and underutilized computational-resource problem addressed by the currently disclosed methods and systems.

FIG. 13C illustrates estimation of a true needed quantized processing-bandwidth for the VM with processing-bandwidth-consumption history illustrated by plot 1316 in FIG. 13A. In plot 1360 in FIG. 13C, the processing-bandwidth-consumption curve 1362 corresponding to the datapoints in plot 1316 of FIG. 13A is again plotted. In plot 1360, a set of horizontal lines, such as horizontal line 1364, represent different fractions of the processing bandwidth corresponding to a single standardized CPU. Horizontal line 1364, for example, represents 20% of the processing bandwidth of a single standardized CPU. If a processing bandwidth of 1.2 CPU were allocated to the VM, as represented by horizontal line 1366, then the line-shaded regions underneath the processing-bandwidth-consumption curve 1368-1370 would represent overutilization of the allocated processing-bandwidth resource. The fraction of overutilization to the total utilization by the VM can be computed as the ratio of the sums of the areas of the lined regions to the total area underneath the processing-bandwidth curve. A histogram 1372 can be computed to show the percentage of the total needed processing bandwidth available to the VM given different fractional allocations of one standardized CPU to the VM. When the VM is allocated 2.2 or more units of processing bandwidth, as represented by horizontal line 1374, the VM receives 100% of the VM's processing-bandwidth needs over the course of execution, from time point $t_0$ 1376 to time point $t_f$ 1378. Thus, in the histogram 1372, everything to the right of a fractional processing bandwidth allocation of 2.2 1380 lies under the 100% column-height line 1382. However, when the VM is allocated 2.0 units of processing bandwidth, as represented by horizontal line 1384, the VM receives 94% of the VM's processing-bandwidth needs over the course of execution or hosting, due to the small portion of the region underlying the processing-bandwidth-consumption curve 1386 above horizontal line 1384. As the fractional standardized CPU allocation decreases, the percentage of the VM's processing-bandwidth needs satisfied by the allocation steadily decreases, as indicated by the decreasing heights of the columns in histogram 1372 as the fractional standardized CPU allocation decreases. If it were desired to allocate a sufficient fractional standardized CPU processing bandwidth to the VM to enable the VM to receive 94% of the VMs need over the course of execution, then the VM should be allocated 1.2 standardized CPUs of processing bandwidth, as indicated by dashed line 1386 and column 1388 in the histogram 1372. An allocation of 1.4 standardized CPUs of processing bandwidth would enable the VM to receive 97.3% of the VM's needed processing bandwidth, as represented by the height of column 1390 in histogram 1372. Thus, by analyzing the historical processing-bandwidth consumption of a VM, it is possible to determine the fractional standardized CPU processing bandwidth needed to achieve a threshold percentage of the VM's processing-bandwidth need. Since processing bandwidth is allocated by standardized CPU, rather than by fractional standardized CPU, the true processing-bandwidth need of a VM is the ceiling of the fractional standardized CPU value for a given target percentage of the full processing-bandwidth needed of the VM. In the currently disclosed implementations, a target percentage of 95% is employed to determine the needed processing bandwidth in standardized CPUs. Similar calculations, with perhaps a different threshold, can be used to estimate the true memory needs of the VM in quantized memory amounts.

In alternative implementations, the target percentage of the computational-resource need is more straightforwardly computed. As one example, the computational-resource-consumption data, such as that shown in plot 1316 in FIG. 13A, can be processed to select a quantized computational-resource size or capacity for which a target percentage of the data points fall below the horizontal dashed line representing the quantized computational-resource size or capacity. In yet another alternative to implementation, a quantized computational-resource size or capacity may be selected so that the length of the line segments of the computational-resource-consumption curve (1362 in FIG. 13C) falls below the horizontal line representing the quantized computational-resource size or capacity.

Figure 14A:
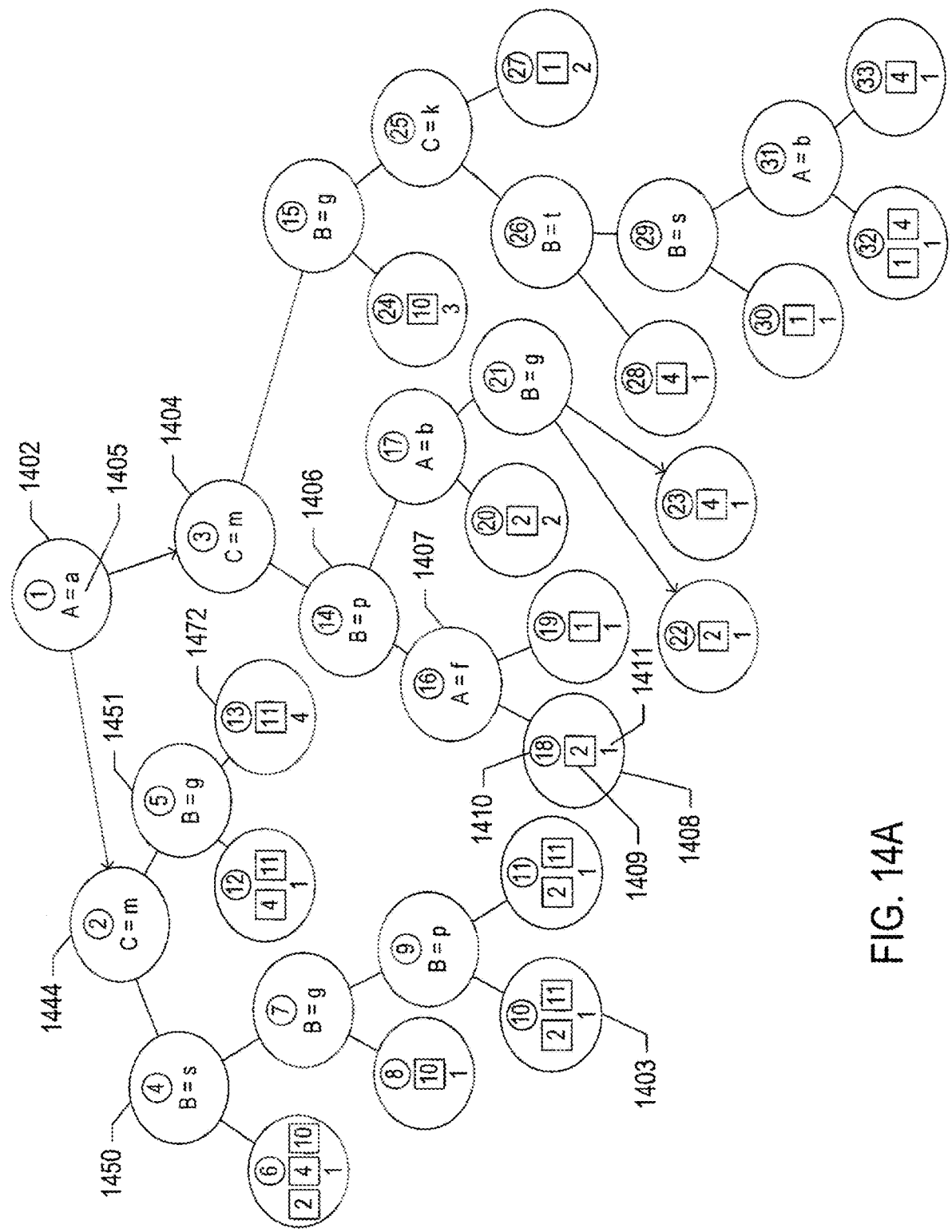

There are many different possible machine-learning methods and technologies that may be employed as a basis for a machine-learning-based resource-value generator. These include automated regression-based classification systems, neural-network classification systems, random forests of decision trees, and a variety of other machine-learning methods and technologies. In the discussion that follows, a decision tree is used as a machine-learning-based resource-value generator employed in the currently disclosed methods and systems. FIGS. 14A-F illustrate construction of a decision tree. FIG. 14A shows the complete decision tree generated from a small dataset, described below. This is an example of a binary decision tree in which each node has two children. Other types of decision trees feature nodes with more than two children. The first node 1402 in the decision tree is referred to as the "root node." Terminal nodes in the decision tree, such as terminal node 1403, are referred to as "leaf nodes." All other nodes of the decision tree, such as node 1404, are referred to as "internal modes." The root node and internal nodes each have two children while the leaf nodes have no children. The root nodes and internal modes are each associated with a rule, such as the rule "A=a" 1405 in root node 1402. A VM characterization, comprising a set of attribute values for a set of attributes (1206 in FIG. 12) that characterize a virtual machine to be hosted on a cloud-computing facility or data center, is input to the root node and used to traverse the decision tree to a leaf node. The leaf node contains either an indication of one or more flavors, described below, that represent the true processing-bandwidth and memory needs of a virtual machine characterized by the VM characterization as determined from previous executions or hostings of VMs described the VM characterization or an indication of predicted processing-bandwidth and memory needs for a virtual machine of a type that has not yet been executed. The decision tree shown in FIG. 14A is generated from each flavor determined for each execution or hosting of a number of virtual machines corresponding to VM characterizations. Below, a different type of decision tree which is generated from a selected flavor based on the aggregate execution histories of each of multiple virtual machines is described. These are both examples of a range of different types of decision trees that may be generated in order to provide estimates for virtual-machine computational-resource needs according to the currently disclosed methods and systems.

In order to illustrate a traversal of the decision tree shown in FIG. 14A, an example VM characterization is used. The example VM characterization includes three attribute values "f," "p," "m" for three attributes represented by upper-case letters "A," "B," and "C." In this example, the three attributes "A," "B," and "C" are categorical attributes, meaning that each of the attributes is associated with a set of unordered attribute values, in this example represented by lower-case characters. Non-categorical attributes may be associated with integer or real values or with ordered sets of values. For categorical values, each of the rules shown in the decision-tree nodes has the form of an attribute, an equals operator "=," and an attribute value. When the VM characterization input to a node includes the attribute value specified in the rule, a traversal of the decision tree continues with the left-hand child node. Otherwise, the traversal continues with the right-hand child node. For non-categorical attributes, rules may include additional comparison operators, such as "≤," "≥," "<," and ">." Applying the rule "A=a" in the root node to the set of attribute values {A=f, B=p, and C=m} returns the Boolean value FALSE since the value of attribute A in the VM characterization is not "a." Therefore, the traversal of the decision tree continues with the right-hand child node 1404. When the rule "C=m" in this node is applied to the attribute values {A=f, B=p, and C=m}, the Boolean value TRUE is returned, since the value of attribute C in the VM characterization is "m." Therefore, traversal of the decision tree continues with node 1406. Application of the rule in node 1406 also returns the Boolean value TRUE, so traversal continues with node 1407. Application of the rule in node 1407 also returns the Boolean value TRUE, in which case traversal ends with leaf node 1408. The numeric value "2" in the small square box 1409 in this node indicates that the flavor that should be associated with the VM characterized by the set of attribute values {A=f, B=p, and C=m} is "2." As further discussed below, the numeric values in square boxes in a leaf node represent the flavor or flavors historically associated with VMs with VM characterizations that, when used to traverse the decision tree, terminate at the leaf node. The numeric values in circles within a decision-tree node, such as the value "18" within circle 1410 in node 1408, indicate the set of data entries corresponding to the node, as further discussed below. The numeric value at the bottom of each node, such as the numeric value "1" 1411 at the bottom of node 1408, indicates the number of different VM characterizations represented by the node. For the decision tree shown in FIG. 14A, a leaf node with multiple flavor values is always associated with a single VM characterization while a leaf node with a single flavor value may be associated with an arbitrary number of VM characterizations.

Figure 14B:
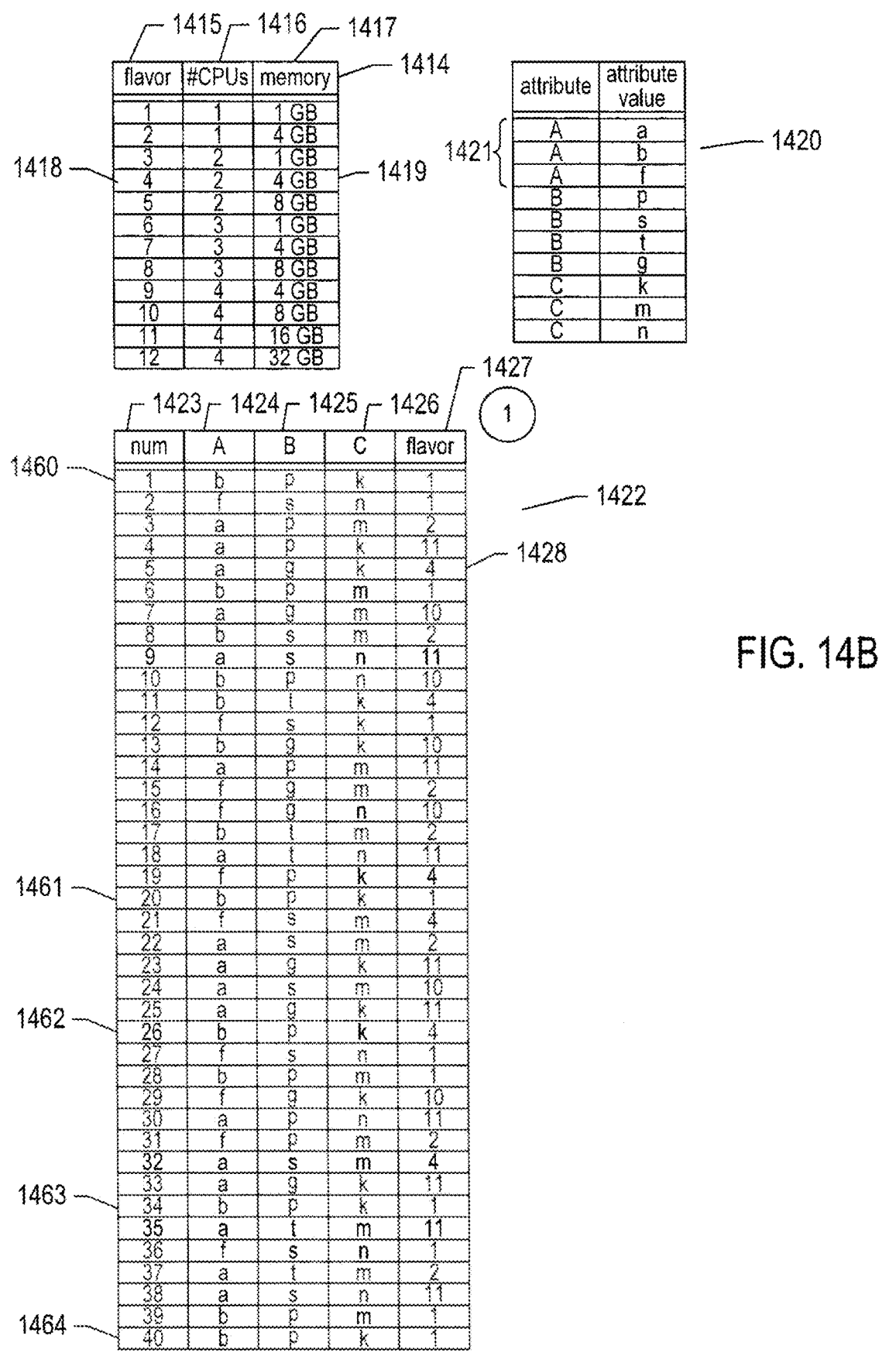

FIG. 14B shows two tables illustrating the meaning of the flavor and attribute values in the example dataset used to generate the decision tree shown in FIG. 14A as well as the dataset used to generate the decision tree. Table 1414 shows 12 different flavor values corresponding to different quantized processing-bandwidth requirements and memory requirements. The numeric identifiers for the different flavors are shown in a first column 1415, the number of standardized CPUs needed for execution of the various executables included in the VM are shown in column 1416, and the quantized memory value needed for execution of the various executables included in the VM are shown in column 1417. Thus, for example, the flavor "4" 1418 corresponds to 2 standardized CPUs and 4 GB, as indicated by table entry 1419. In real examples, of course, the number of flavors may vary depending on how the combined processing-bandwidth and memory needs are quantized as well as on the number of different specified processing-bandwidth/memory specifications desired.

Table 1420 shows the different attribute values for each of the three attributes A, B, and C. Thus, according to the first three entries 1421 in table 1420, the attribute A can have one of the three attribute values {a, b, f}. Table 1422 shows the dataset used to generate the decision tree shown in FIG. 14A. Column 1423 in table 1422 represents a number identifier, or index, of each data entry, the next three columns 1424-1426 represent the attribute values for the three attributes A, B, and C, and the final column 1427 indicates the particular flavor that was needed for one historical execution of a VM characterized by the attribute values in the entry. Thus, entry 1428 indicates that a VM characterized by the attribute values {a, g, k} needed a true flavor of 4.

Construction of the decision tree begins with table 1422. A rule needs to be selected for the root node. Since all of the attributes are categorical, in this example, there are only 10 possible rules of the form attribute/=/attribute-value, corresponding to the 10 entries in table 1420, for the root-node rule. In order to select one of these 10 possible rules, the entropy gain obtained by partitioning the dataset 1422 into two datasets using the rule is computed for each rule. At the top of FIG. 14C, table 1430 shows the computed entropy gains for each possible rule. The smaller the value of an entropy gain, the better the rule. Thus, the computed entropy-gain values indicate that rule "A=a" provides a best entropy gain, as indicated by the star 1431 next to the entry corresponding to this rule. Expression 1432 shows how the entropy for a dataset is computed. The lowest possible entropy value for dataset is 0, when all of the flavor values for the entries in the dataset are identical. The entropy gain obtained by applying a rule to partition a dataset into two child datasets is indicated by expression 1434. The entropy gain is the entropy of the dataset 1436 minus the weighted sum of the entropies of the child datasets 1437-1438, where the weight is computed according to expression 1439. Since rule "A=a" is selected for the root node based on exhibiting the lowest and most favorable entry gain for all possible rules, the original dataset 1422 in FIG. 14B is divided into the two child datasets 1440 and 1441. Note these two datasets are associated with the circled numerical values "2" 1442 and "3" 1443. These are the circled dataset values shown for nodes 1404 and 1444 in FIG. 14A. Thus, each node is associated with a dataset and the child nodes of an internal node are associated with datasets obtained by partitioning the dataset associated with the internal node using the rule included in the internal node. Those entries of a dataset for which the rule returns Boolean value TRUE are included in a left-hand child dataset and those entries in the dataset for which the rule returns a Boolean value FALSE are included in a right-hand child dataset. Table 1445 shows the entropy gains calculated for seven possible rules that can be applied to dataset 1440 and thus constitute the possible rules for node 1444 in the decision tree shown in FIG. 14A. The most desirable entropy gain is exhibited by the rule "C=m," as indicated by star 1446. Thus, the rule "C=m" is included in decision-tree node 1448, in FIG. 14A, and dataset 1440 is then partitioned by this rule into datasets 1448 and 1449, shown at the top of FIG. 14D. These two datasets are then associated with the child nodes of node 1444, node 1450 and node 1451 in FIG. 14A. FIGS. 14C-F show all of the datasets associated with the nodes in the decision tree of FIG. 14A as well as tables of calculated entropy-gain values used to select rules for certain of the internal nodes.

Figure 15A:
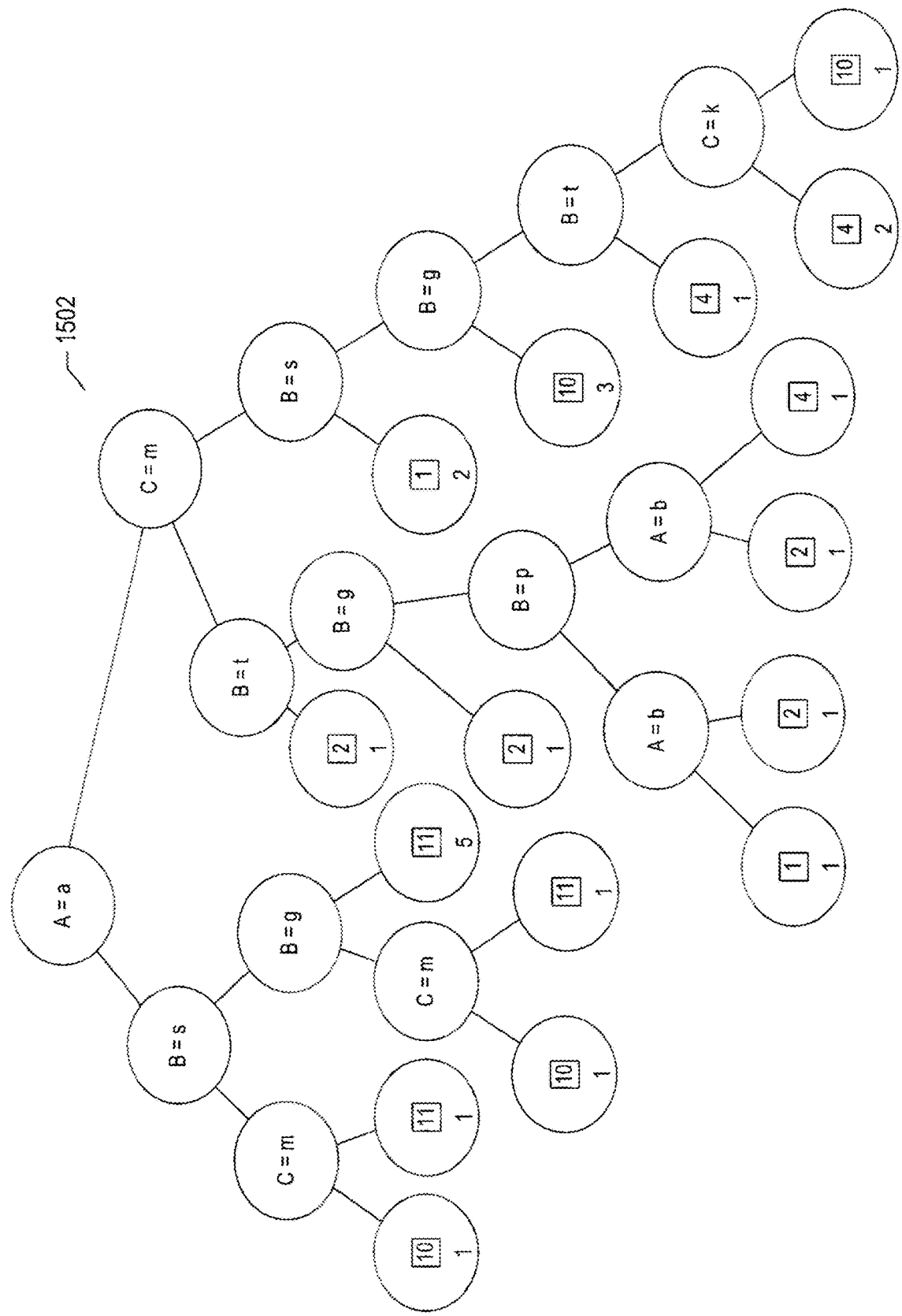

FIGS. 15A-B illustrate a second decision tree and the dataset from which the second decision tree is generated. The decision tree 1502 shown in FIG. 15A is illustrated using the same illustration conventions used for illustrating the decision tree shown in FIG. 14A, with the exception that the nodes are not annotated with circled numerals indicating the datasets corresponding to the nodes. FIG. 15B shows the dataset used to generate the decision tree shown in FIG. 15A. The dataset 1504 is generated from dataset 1422 shown in FIG. 14B. In this case, for any VM characterization that occurs multiple times in dataset 1422, the highest numerically valued flavor associated with any of the multiple occurrences is selected and the multiple entries are collapsed into a single entry with the selected flavor value. For example, the VM characterization {A=b, B=p, and C=k} occurs 5 times in dataset 1422 in entries 1460-1464. The largest flavor in this set of entries is "4," and so, in table 1504 shown in FIG. 15B, the five entries 1460-1464 in table 1422 are replaced with the single entry 1506. In decision tree 1502, all leaf nodes contain only a single flavor value. When a VM characterization is used to traverse the decision tree 1502, the flavor value in the terminal leaf node arrived at in the traversal is equal to the largest flavor value in the terminal node reached by a traversal of the decision tree shown in FIG. 14A. This illustrates the fact that decision trees may be generated from entries corresponding to each historical execution of a set of VMs or from aggregate information compiled from all of the historical executions of each VM represented by a unique VM characterization. These two types of decision trees represent a trade-off in the amount of information stored in leaf nodes versus the computational complexity of generating the decision tree. In the case of the decision tree shown in FIG. 14A, each leaf node contains the different flavors associated with all executions of VMs corresponding to the leaf node. This would allow estimation of the needed flavor for a VM from all possible flavors required by the VM during historical executions. In fact, the leaf nodes could even include the number of executions associated with each different flavor value. In this case, for example, if a particular leaf node showed that a particular VM characterization required flavor 1 for 35 different historical executions and required flavor 10 for one historical execution, it might be prudent to estimate the required flavor for the VM characterization as 1, with the assumption that the single historical execution that required flavor 10 some kind of outlier. However, the same information can be determined, in advance, by generating an aggregate flavor for the VM characterization and then generating a decision tree such as that shown in FIG. 15A, the difference being that when a flavor is estimated based on a traversal of the decision tree, the historical information related to the flavor indicated in a leaf node in the decision tree shown in FIG. 15A is not included in the leaf node itself. By contrast, table 1504 contains fewer entries than table 1422, as a result of which it is computationally easier to generate decision tree 1502 than the decision tree shown in FIG. 14A. There may be a wide variety of different types of information stored in leaf nodes. For example, leaf nodes may initially store all of the different flavors associated with historical executions of a VM characterization until there is a sufficient number of available historical executions, after which the leaf node may store only the mean or average flavor along with a variance or standard deviation computed from the historical executions. When the number of historical executions exceeds a second threshold, the leaf node may store only a single flavor value based on the aggregate historical executions. Alternatively, the leaf node may store a running mean or average for the historical executions, so that when operational characteristics of a particular VM characterization change, for any of various reasons, the decision tree can quickly respond to the operational-characteristics change. In yet an additional implementation, a leaf node may contain a single flavor value along with a confidence value associated with selection of the single flavor value from multiple historical flavor values associated with the VM characterization represented by the leaf node.

Next, a traversal of the decision tree shown in FIG. 14A using the VM characterization {A=a, B=s, C=k} is next considered. Application of the rule in node 1402 leads to node 1444. Application of the rule in node 1444 leads to node 1451. Application of the rule in node 1451 leads to node 1472. Node 1472 corresponds to table 1474 shown in FIG. 14D. A review of this table reveals that the VM characterization {A=a, B=s, C=k} does not occur in the table and, in fact, does not occur in dataset 1422, shown in FIG. 14B, from which the decision tree shown in FIG. 14A was generated. This shows that the decision tree can provide an estimate for the flavor needed by a VM characterized by a particular VM characterization even though there is no historical data for execution of a VM with that characterization. Since the estimate is not based on actual historical-execution information, it may be less reliable than estimates based on historical-execution information. However, when the attributes in the attributes set used to characterize VMs are generated from logically overlapping information or when the number of attributes in the attribute set is relatively large, an estimate returned by traversal of the decision tree, even though not based on actual historical-execution information, may nonetheless be accurate. Note also that the decision tree can be traversed with an attribute set in which certain attribute values are not specified, with some type of value indicating the unavailability of the attribute value included in the attribute-value set that characterizes a VM.

Figure 16A:
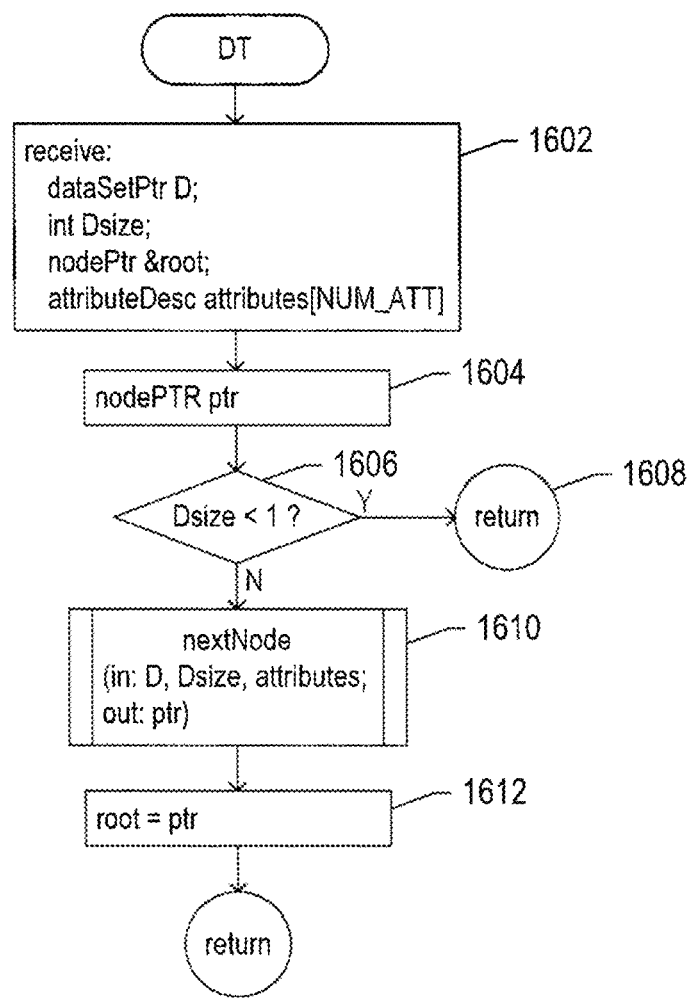
FIGS. 16A-C provide control-flow diagrams that illustrate construction of a decision tree used, according to the currently disclosed methods and systems, to estimate the flavor for a particular VM characterization.
Figure 16B:
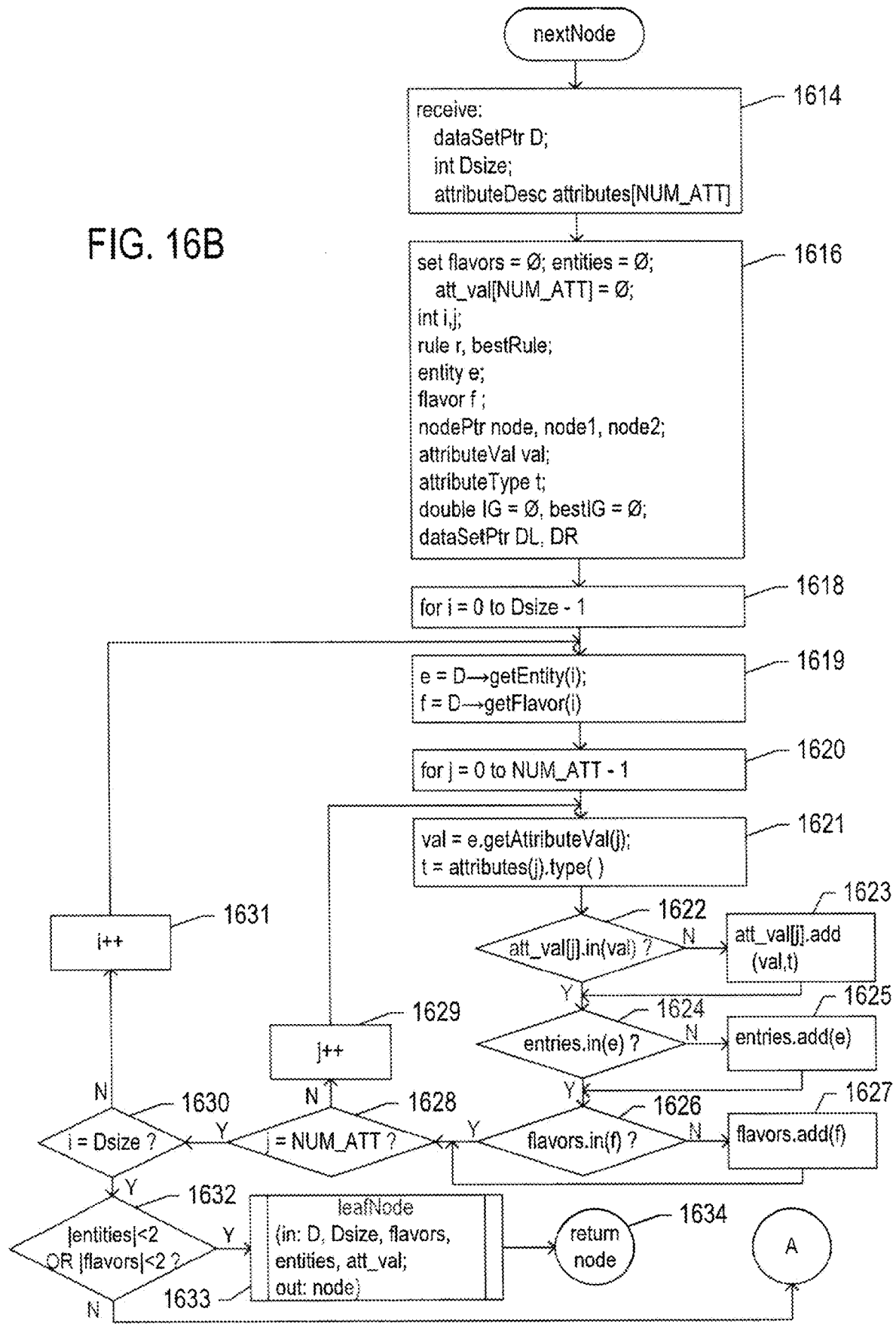
Figure 16C:
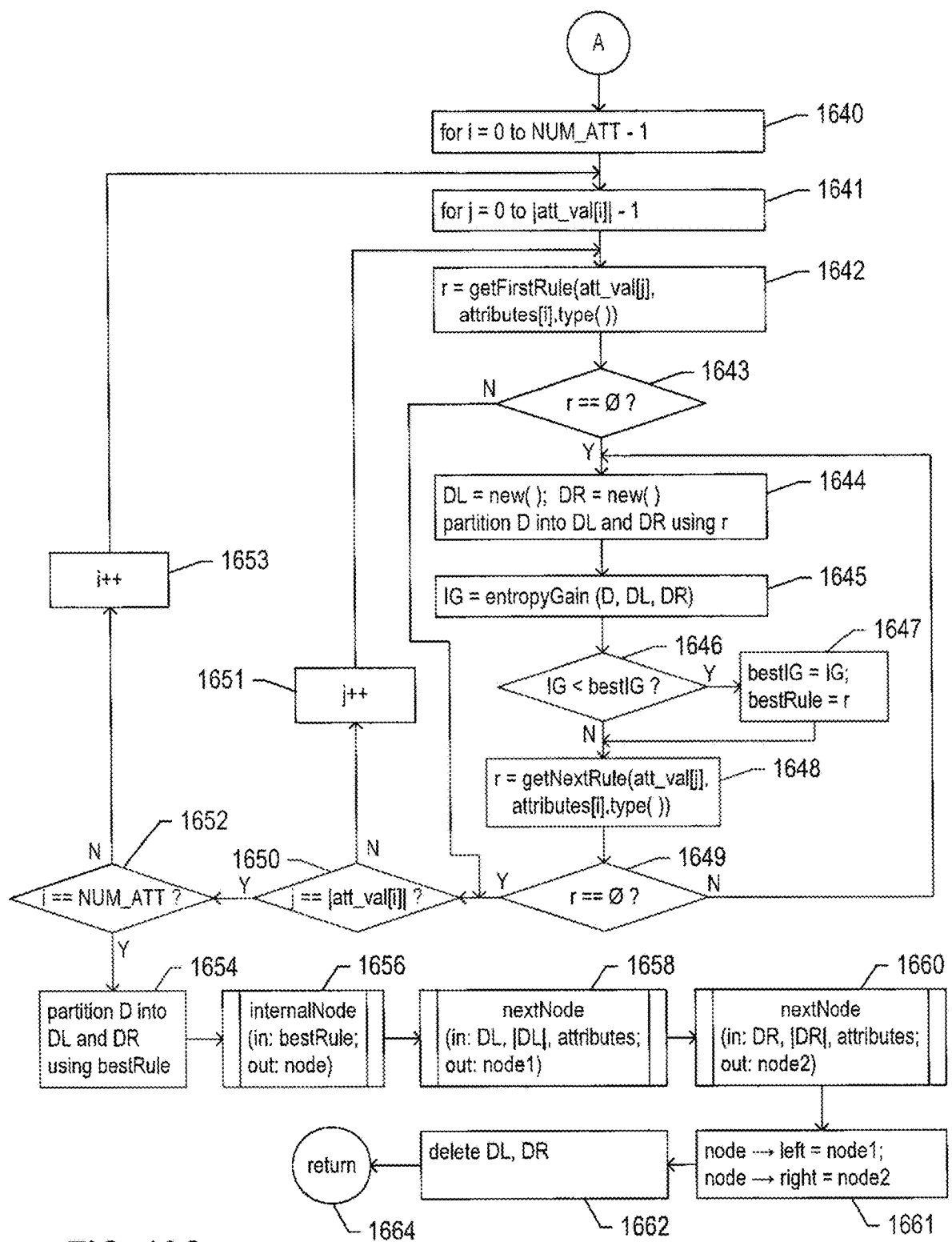

FIGS. 16A-C provide control-flow diagrams that illustrate construction of a decision tree used, according to the currently disclosed methods and systems, to estimate the flavor for a particular VM characterization. FIG. 16A provides a control-flow diagram for a routine "DT" that generates a decision tree from a dataset, such as dataset 1422 in FIG. 14B or dataset 1504 in FIG. 15B. Again, to be clear, the example datasets shown in FIGS. 14B and 15B contain VM characterizations that include only three attributes, each with only a handful of associated attribute values. In actual practice, VM characterizations include a larger set of descriptive attributes, such as the set of attributes 1206 discussed with respect to FIG. 12, above. In step 1602, the routine "DT" receives a pointer to a dataset, D, the size of the dataset, Dsize, the address of a node pointer root in which to enter a node pointer for the root node of the constructed decision tree, and an array of attribute descriptors attributes that describe the NUM_ATT attributes contained in each entry of the dataset. In step 1604, the routine "DT" declares a local variable ptr that references a node of a decision tree. When the size of the received dataset is less than 1, as determined in step 1606, the routine "DT" returns, in step 1608, with the received address root left unaltered as an indication that no decision tree was constructed. Otherwise, in step 1610, a routine "nextNode" is called to construct a decision tree from the dataset referenced by the dataset pointer D. Then, in step 1612, the node pointer ptr returned by the call to the routine "nextNode" is stored in the location referenced by the received pointer address root.

FIG. 16B provides a control-flow diagram for the routine "nextNode," called in step 1610 of FIG. 16A. In step 1614, the routine "nextNode" receives three of the same arguments received by the routine "DT," in step 1602 of FIG. 16A, including a pointer to a dataset D, an indication of the size the dataset Dsize, and an array of attribute descriptors attributes. Note that the dataset referenced by the received dataset pointer D may be different for each invocation of the routine "nextNode." In step 1616, the routine "nextNode" declares the following local variables: (1) flavors, a set variable initialized to the null set that contains a set of flavor values; (2) entities, a set variable initialized to the null set that contains a set of attribute values, other than the indication of a flavor, a characterized as a VM; (3) att_val, an array of NUM_ATT attribute-value sets, all of which are initialized to the null set; (4) i and j, two integer variables used as loop variables; (5) r and bestRule, two rule variables that each contains a rule, such as a rule being evaluated for inclusion in a decision-tree node; (6) e, an entity local variable that contains a set of attributes, other than the indication of a flavor, that characterize a VM; (7) f, a flavor local variable that contains a flavor value; (8) node, node1, and node2, three pointers to decision-tree nodes; (9) val, an attribute-value local variable; (10) t, and attribute-type local variable; (11) IG and bestIG, two floating-point variables that store computed information gains; and (12) DL and DR, two pointers to datasets.

In the outer for-loop of steps 1618-1631, the routine "nextNode" considers each entry in the dataset pointed to by dataset pointer D. In step 1619, local variable e is set to the attribute values of the currently considered dataset entry and local variable f is set to the flavor value in the currently considered dataset entry. In the inner for-loop of steps 1620-1629, the routine "nextNode" considers each attribute in the dataset entry currently considered by the outer for-loop of steps 1618-1631. In step 1621, local variable val is set to the currently considered attribute value and local variable t is set to the type of the currently considered attribute. When, as determined in step 1622, the currently considered attribute value is not already included in the set of attribute values att_val[j], the currently considered attribute is added to the set of attribute values att_val[j], and step 1623. When, as determined in step 1624, the set of attributes for the currently considered dataset entry stored in local variable e are not already included in the set entries, the set of attributes for the currently considered dataset entry e is added to the set entries, in step 1625. When, as determined in step 1626, the currently considered flavor value f is not already included in the set of flavor values flavors, the currently considered flavor value is added to the set of flavor values flavors, in step 1627. When there is another attribute to consider in the for-loop of steps 1620-6029, as determined in step 1628, control flows to step 1629, where the loop variable j is incremented, and then back to step 1621 for another iteration of the for-loop of steps 1620-1629. Otherwise, when there is another dataset entry to consider in the for-loop of steps 1618-1631, as determined in step 1630, control flows to step 1631, where the loop variable i is incremented, and then back to step 1619 for another iteration of the outer for-loop of steps 1618-1631. Following completion of the outer for-loop of steps 1618-1631, the routine "nextNode" determines, in step 1632, whether the number of attribute sets in the set entries is less than 2 or the number of flavors in the set flavors is less than 2. If so, then the dataset referenced by the received dataset pointer D is not partitionable, and therefore a routine "leaf node" is called, in step 1634, to generate a leaf node corresponding to the dataset referenced by the received dataset pointer D and return a pointer node to the generated leaf node. The pointer node is returned in step 1634. As discussed above, the contents of a leaf node may vary with different implementations. A leaf node may include a single flavor value for recommendation for any VM characterization that, on a traversal of the decision tree, ends up at the leaf node. By contrast, a leaf node may include additional information that can be used for estimating the flavor value, such as a mean flavor value and standard deviation or variance or indications of the number of historical executions corresponding to each of multiple flavor values. When the dataset referenced by the received dataset pointer D is partitionable, as determined in step 1632, control flows to step 1640 in FIG. 16C.

In the nested for-loops of steps 1640-1653, the routine "nextNode" evaluates each possible rule that can be included in an internal decision-tree node corresponding to the dataset referenced by the received dataset pointer D. The outer for-loop of steps 1640-1652 considers each attribute and the inner for-loop of steps 1641-1651 considers each attribute value contained in the dataset referenced by dataset pointer D for the attribute currently considered in the outer for-loop of steps 1640-1653. In step 1642, a first ruler is generated based on the attribute values and attribute type of the currently considered attribute. The types of rules generated depend on the type of attribute, as discussed above. When no rule can be generated for the attribute, as determined in step 1643, control flows to step 1650, where another iteration of the for-loop of steps 1641-1651 is considered. Otherwise, in step 1644, the dataset referenced by the dataset pointer D is partitioned into two child datasets referenced by the dataset pointers DL and DR. In step 1645, the entropy gain for this dataset partitioning is computed and stored in local variable IG. When the value stored in local variable IG is less than the value stored in local variable bestIG, as determined in step 1646, local variable bestIG is set to the contents of local variable IG and local variable bestRule is set to the contents of local variable r, in step 1647. In step 1648, the routine "nextNode" attempts to generate yet an additional rule for the currently considered attribute and corresponding set of attribute values. If a next rule is successfully generated, as determined in step 1649, control flows back to step 1644. Otherwise, control flows to step 1650. If the current value of loop variable j is equal to the number of attribute values in the set of attribute values att_val[j], as determined in step 1650, then the for-loop of steps 1641-1651 and terminates, and control flows to step 1652. Otherwise, the loop variable j is incremented, in step 1651, and control returns to step 1642 for another iteration of the for-loop of steps 1641-1651. When the loop variable i is equal to the number of attributes, NUM_ATT, as determined in step 1652, the for-loop of steps 1640-1653 terminates. Otherwise, the loop variable i is incremented, in step 1653, and control returns to step 1641 for another iteration of the inner for-loop of steps 1641-1651. Following termination of the nested for-loops of steps 1640-1653, the dataset referenced by the received dataset pointer D is partitioned into two child datasets referenced by the dataset pointers DL and DR, using the rule stored in the local variable bestRule, in step 1654. In step 1656, a routine "internal node" is called to allocate a new internal node containing the rule stored in the local variable bestRule and return a pointer node to the new internal node. In step 1658, the routine "next node" is recursively called to generate a first child subtree, referenced by the node pointer node1 and, in step 1660, the routine "next node" is again recursively called to generate a second child subtree, referenced by the node pointer node2. In step 1661, the newly created internal node is updated to reference the two subtrees generated in steps 1658 and 1660. Finally, in step 1662, the child datasets referenced by dataset pointers DL and DR are deleted.

Figure 17:
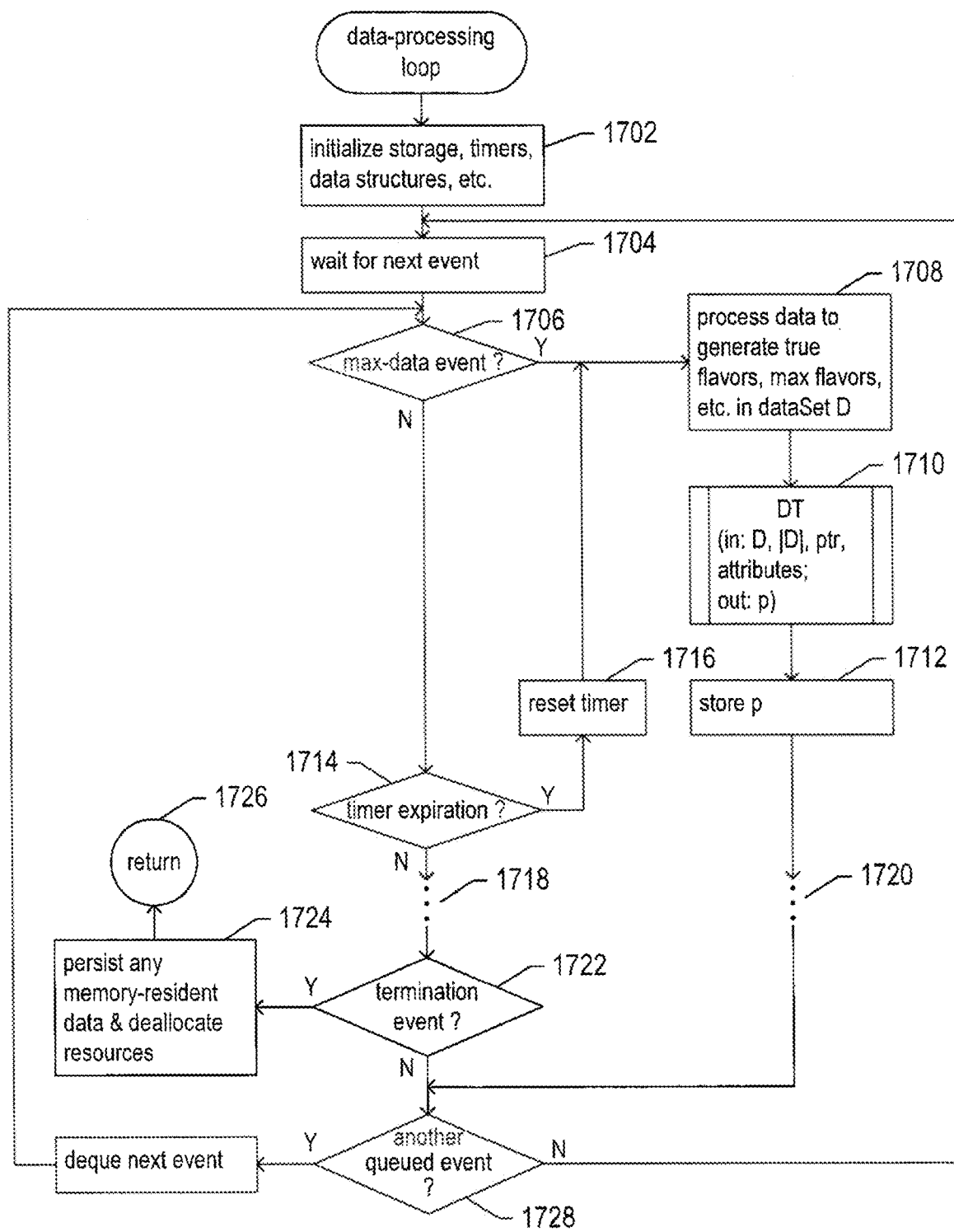
FIG. 17 provides a control-flow diagram for a routine "data-processing loop" that represents ongoing decision-tree generation by a flavor-recommendation module that may be incorporated into various additional modules or provided as a service to distributed-application developers.

FIG. 17 provides a control-flow diagram for a routine "data-processing loop" that represents ongoing decision-tree generation by a flavor-recommendation module that may be incorporated into various additional modules or provided as a service to distributed-application developers. In step 1702, the routine "data-processing loop" initializes storage, timers, data structures, and other computational and data-storage entities. Then, in step 1704, the routine "data-processing loop" waits for the occurrence of a next event. When the next occurring event is a max-data event, as determined in step 1706, indicating that a sufficient amount of new historical VM-execution data has been generated for a particular organization to justify generating a new flavor-recommendation decision tree, then, in step 1708, the dataset is processed to generate true flavor values for the data entries as well as to, in certain implementations, generate aggregate flavor-value indications for particular VM characterizations. In step 1710, the routine "DT," discussed above with reference to FIGS. 16A-C, is called to generate a flavor-recommendation decision tree based on the dataset. In step 1712, the newly created flavor-recommendation decision tree is stored for use in providing flavor recommendations for VM characterizations for the organization. In certain implementations, the dataset may be deleted or cleared while, in other implementations, a pointer to the most recently considered entry in the dataset is updated. When the next occurring event is a timer-expiration event, as determined in step 1714, the timer is reset, in step 1716, and control flows to step 1708 for processing the dataset and generating a new flavor-recommendation decision tree. Ellipses 1718 and 1720 indicate that additional types of events may be handled by the routine "data-processing loop." When the next occurring event is a termination event, as determined in step 1722, data that needs to be persisted is persisted and computational resources are deallocated, in step 1724, prior to termination of the routine "data-processing loop" in step 1726. When there is another queued event to handle, as determined in step 1728, the next queued event is dequeued and control returns to step 1706. Otherwise, control returns to step 1704. There may be an additional default event handler, following step 1722 in preceding step 1728, to handle any rare and unexpected events. The routine "data-processing loop" is one example of many different possible flavor-recommendation modules that generate flavor-recommendation decision trees for use in estimating flavors for VM characterizations. In certain implementations, a flavor-recommendation module may be implemented in an organization-specific fashion to maintain flavor-recommendation decision trees used within a particular organization. In other implementations, a flavor-recommendation module may be implemented to generate flavor-recommendation data trees for multiple organizations which host VMs on a set of one or more cloud-computing facilities and data centers. Alternatively, a flavor-recommendation module may be included within a distributed-application-blueprint generation module.

Figure 18:
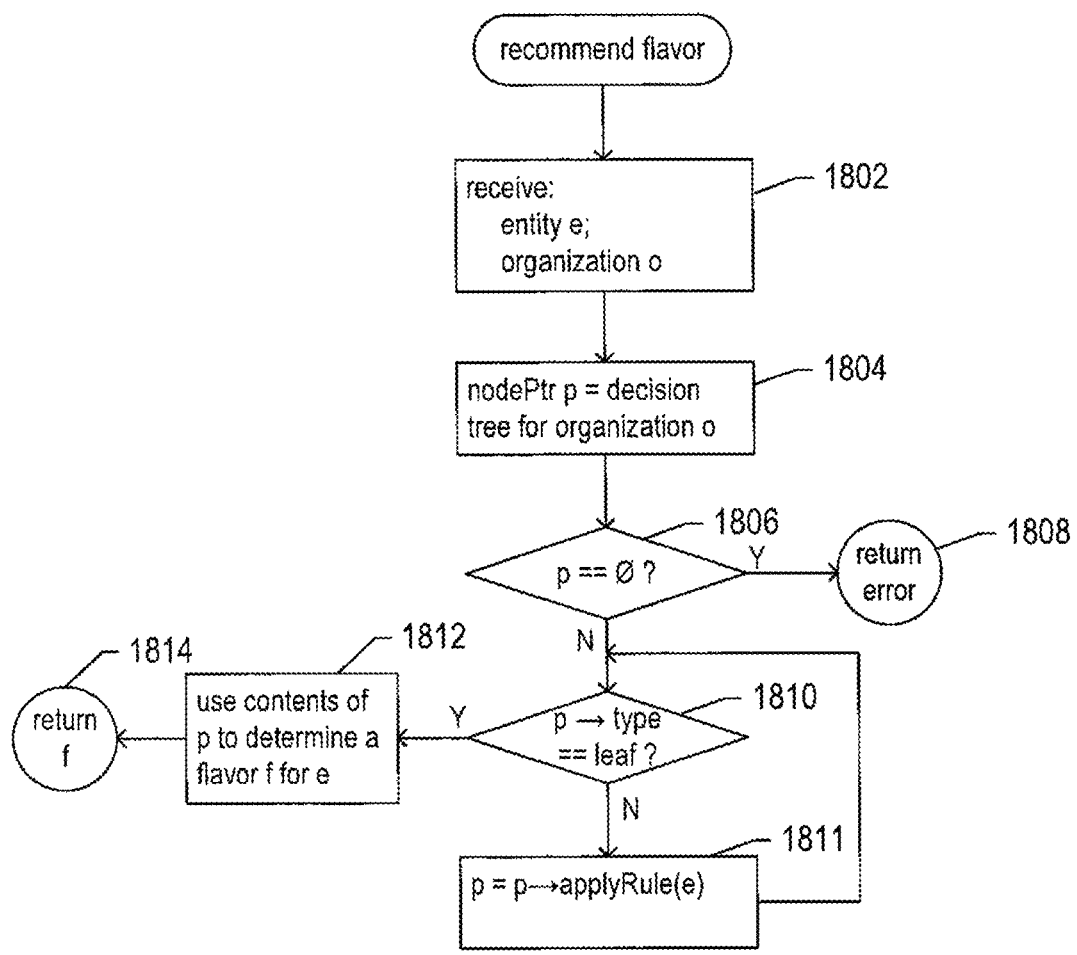
FIG. 18 provides a control-flow diagram for a routine "recommend flavor," which receives a VM characterization comprising values for multiple attributes and returns a recommended flavor for hosting a VM corresponding to the received VM characterization.

FIG. 18 provides a control-flow diagram for a routine "recommend flavor," which receives a VM characterization comprising values for multiple attributes and returns a recommended flavor for hosting a VM corresponding to the received VM characterization. In step 1802, the routine "recommend flavor" receives a VM characterization as a set of attributes e and an indication of a particular organization o. In step 1804, the routine "recommend flavor" selects a decision tree for the organization and sets a node pointer p to the root node of the selected decision tree. When node pointer p contains a null value, as determined in step 1806, indicating that there is no decision tree for organization o, the routine "recommend flavor" returns an error indication in step 1808. Otherwise, the decision tree referenced by node pointer p is traversed, in steps 1810-1811, until node pointer p points to a leaf node of the decision tree. Then, in step 1812, the contents of the leaf node are used to determine a flavor for the VM characterization input to the routine "recommend flavor," which is returned in step 1814.

The present invention has been described in terms of particular embodiments, it is not intended that the invention be limited to these embodiments. Modifications within the spirit of the invention will be apparent to those skilled in the art. For example, any of many different implementations can be obtained by varying various design and implementation parameters, including modular organization, control structures, data structures, hardware, operating system, and virtualization layers, and other such design and implementation parameters.

The invention claimed is:

1. A system comprising:
   one or more processors;
   one or more memories;
   one or more data-storage devices; and
   computer instructions that, when executed by one or more of the one or more processors, controls the system to
      store a plurality of computational-resource-consumption datasets collected during each hosting of each of multiple virtual machines by one or more distributed-computer-system-based hosting platforms, each computational-resource-consumption dataset comprising a memory consumption and a processing-bandwidth consumption of a respective virtual machine during a respective hosting,
      generate, for each of the computational-resource-consumption datasets, a corresponding resource value,
      generate a decision tree using the generated resource values and virtual machine characterizations corresponding to the multiple virtual machines associated with the computational-resource-consumption datasets, the decision tree comprising multiple nodes associated with multiple rules, wherein each rule is associated with a corresponding entropy gain, wherein a rule having the best entropy gain is associated with two datasets of the plurality of computational-resource-consumption datasets,
      receive a request for a computational-resource specification for a virtual machine of the multiple virtual machines,
      input a virtual machine characterization of the virtual machine characterizations for the virtual machine to the decision tree;
      generate a response to the received request containing the computational-resource specification generated from output of the decision tree; and
      execute the virtual machine using an allocated computational hardware resource based at least on the response.

2. The system of claim 1, wherein each virtual machine characterization is a set of attribute values corresponding to a set of attributes of a respective virtual machine.

3. The system of claim 2, wherein the attributes include one or more of:
   a user email address;
   a user role identifier;
   a distributed-application-blueprint identifier;
   a data-center or cloud-computing-facility identifier;
   a project identifier; and
   a resource-image identifier.

4. The system of claim 2, wherein the decision tree multiple nodes comprise:
   a root node;
   multiple internal nodes; and
   multiple leaf nodes.

5. The system of claim 4, wherein the root node and multiple internal nodes each include a rule and references to two child nodes, each child node either an internal node or a leaf node; and wherein the leaf nodes each include one or more resource values.

6. The system of claim of claim 5, wherein the rule is a Boolean expression comprising:
   an indication of an attribute;
   a comparison operator; and
   an attribute value.

7. The system of claim 6, wherein when the virtual machine characterization is input to the decision tree, the system is controlled to:
   return contents of a leaf node of the decision tree, wherein the leaf node is based on a traversal of the decision tree and the multiple rules.

8. The system of claim 7, wherein
   one of the resource values is based on additional information contained in the contents of the leaf node.

9. The system of claim 2, wherein each resource value is an identifier for a set of quantized computational-resource capacity or size values.

10. The system of claim 9, wherein a quantized computational-resource capacity or size value is one of:
    a number of the one or more processors;
    a number of megabytes of the one or more memories;
    a number of gigabytes of the one or more memories;
    a number of megabytes of capacity of the one or more data-storage devices;
    a number of gigabytes of capacity of the one or more data-storage devices; and
    a number of terabytes of capacity of the one or more data-storage devices.

11. The system of claim 9, wherein each resource value is based on
    a set of computational hardware resources
       and a quantized computational-resource capacity or size that would satisfy a target percentage of a resource-consumption need for the virtual machine.

12. A method executed by a system having one or more processors, one or more memories, and one or more data-storage devices, the method comprising:
    receiving a request for a computational-resource specification for a virtual machine, the computational-resource specification comprising a memory consumption and a processing-bandwidth consumption of the virtual machine, the virtual machine associated with a dataset of a plurality of datasets;
    generating a decision tree using a resource value corresponding to the dataset of the plurality of datasets and a characterization of the virtual machine, the decision tree comprising multiple nodes associated with multiple rules, wherein each rule is associated with a corresponding entropy gain, wherein a rule having the best entropy gain is associated with two datasets of the plurality of datasets;

inputting machine the characterization for the virtual machine to the decision tree;

generating a response to the received request containing the computational-resource specification generated from output of the decision tree; and executing the virtual machine using an allocated computational hardware resource based at least on the response.

13. The method of claim 12, wherein the characterization of the virtual machine is a set of attribute values corresponding to a set of attributes.

14. The method of claim 13, wherein the attributes include one or more of:
   a user email address;
   a user role identifier;
   a distributed-application-blueprint identifier;
   a data-center or cloud-computing-facility identifier;
   a project identifier; and
   a resource-image identifier.

15. The method of claim 13, wherein the multiple nodes:
   a root node;
   multiple internal nodes; and
   multiple leaf nodes.

16. The method of claim 15, wherein the root node and multiple internal nodes each include a rule and references to two child nodes, each child node either an internal node or a leaf node; and wherein the leaf nodes each include one or more resource values.

17. The method of claim of claim 16, wherein the rule is a Boolean expression comprising:
   an indication of an attribute;
   a comparison operator; and
   an attribute value.

18. The method of claim 17 wherein when the characterization is input to the the decision tree, the the method further comprises:
   returning contents of a leaf node of the decision tree, wherein the leaf node is based on a traversal of the decision tree and the multiple rules.

19. The method of claim 18, wherein resource value based on the resource value is based on additional information contained in the contents of the leaf node.

20. A data-storage device encoded with processor instructions that, when executed on one or more processors of a computer system, controls the computer system to:
   receive a request for a computational-resource specification for a virtual machine associated with a dataset of a plurality of datasets;
   generate a decision tree using a resource value corresponding to the dataset of the plurality of datasets and a characterization of the virtual machine, the decision tree comprising multiple nodes associated with multiple rules, wherein each rule is associated with a corresponding entropy gain, wherein a rule having the best entropy gain is associated with two datasets of the plurality of datasets;
   input the characterization for the virtual machine to the decision tree;
   generate a response to the received request containing the computational-resource specification generated from output of the decision tree; and
   execute the virtual machine using an allocated computational hardware resource based at least on the response.

* * * * *